(12) United States Patent
Yamamoto et al.

(10) Patent No.: US 12,725,849 B2
(45) Date of Patent: Sep. 1, 2026

(54) BATTERY UNIT TEMPERATURE MANAGEMENT DEVICE

(71) Applicant: Mazda Motor Corporation, Hiroshima (JP)

(72) Inventors: Takashi Yamamoto, Aki-gun (JP); Toshiki Takahashi, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 792 days.

(21) Appl. No.: 18/126,511

(22) Filed: Mar. 27, 2023

(65) Prior Publication Data

US 2023/0318067 A1 Oct. 5, 2023

(30) Foreign Application Priority Data

Apr. 4, 2022 (JP) ................................ 2022-062447

(51) Int. Cl.

*H01M 10/615* (2014.01)
*H01M 10/637* (2014.01)
*H01M 10/6554* (2014.01)
*H01M 10/659* (2014.01)

(52) U.S. Cl.

CPC ....... *H01M 10/615* (2015.04); *H01M 10/637* (2015.04); *H01M 10/6554* (2015.04); *H01M 10/659* (2015.04)

(58) Field of Classification Search

CPC ............. H01M 10/6555; H01M 10/63; H01M 10/6568; H01M 50/209; H01M 10/613; H01M 10/615; H01M 2220/20; H01M 10/625; H01M 10/6556; H01M 10/6571; H01M 10/617; H01M 10/486; H01M 10/633; H01M 10/655; Y02E 60/10

See application file for complete search history.

(56) References Cited

U.S. PATENT DOCUMENTS

2018/0123189 A1* 5/2018 Biswas .................. G01N 29/28

FOREIGN PATENT DOCUMENTS

| | | | | |
|---|---|---|---|---|
| CN | 107689469 A | * | 2/2018 | ............ H01M 50/20 |
| DE | 102009035482 A1 | * | 2/2011 | ........ H01M 10/0413 |
| JP | 2003133188 A | * | 5/2003 | ............. H01G 11/00 |
| JP | 2007165698 A | * | 6/2007 | ............. H01G 11/06 |
| JP | 2017-222239 A | | 12/2017 | |

* cited by examiner

*Primary Examiner* — Karie O'Neill Apicella
(74) *Attorney, Agent, or Firm* — XSENSUS LLP

(57) ABSTRACT

A battery unit temperature management device may include a battery unit that can be charged and discharged, a heater that operates due to electricity supply from the battery unit and heats a heat exchange medium that exchanges heat with the battery unit, a changing structure that changes a heat transfer capacity between the battery unit and the heat exchange medium, and a controller that controls the heating of the heat exchange medium by the heater and the change of the heat transfer capacity by the changing structure. When a temperature Tw of the heat exchange medium does not reach a first temperature which is equivalent to a temperature of the battery unit while the heat exchange medium is heated by the heater, the controller may make the heat transfer capacity smaller than that when the temperature of the heat exchange medium has reached the first temperature.

19 Claims, 14 Drawing Sheets

BATTERY UNIT TEMPERATURE MANAGEMENT DEVICE

CROSS-REFERENCE TO RELATED APPLICATION

The present application claims priority to Japanese patent application JP 2022-062447, filed Apr. 4, 2022, the entire contents of which being incorporated herein by reference in its entirety.

TECHNICAL FIELD

The present disclosure relates to a battery unit temperature management device.

BACKGROUND ART

In electric vehicles or hybrid vehicles having battery units (for example, secondary batteries) for driving motors, when the temperature of the battery units drops in cold weather, the electromotive force of the battery units may reduce, possibly reducing the running performance of the vehicles. To prevent such a situation, the structure for heating battery units by using heat exchange media heated by electric heaters is known.

For example, the secondary battery heating device for hybrid vehicles described in patent document 1 includes an internal combustion engine, a lithium-ion battery (battery unit), and a heating device. The heating device includes a latent heat storage material, a cooling water storage tank that receives cooling water (heat exchange medium) for the internal combustion engine and transfers heat to the latent heat storage material, and a cooling water passage through which the cooling water circulates between the cooling water storage tank and the internal combustion engine, and an electric heater disposed in the cooling water storage tank to heat the cooling water in the cooling water storage tank.

BACKGROUND ART

Patent Documents

[Patent document 1] JP-A-2017-222239

SUMMARY

Problems to be Solved by the Disclosure

By the way, when the temperature of the heat exchange medium that is being heated by the heater does not reach the temperature of the battery units, there may be delay in heating the battery units because heat transfers from the battery units to the heat exchange medium. When there is delay in heating the battery units, the performance of the battery units cannot be fully exhibited especially in cold weather.

The present disclosure addresses this and other problems with an object of quickly heating the battery units.

Means for Solving the Problems

According to some embodiments of the present disclosure, there is provided a battery unit temperature management device including: a battery unit that can be charged and discharged; a heater that operates due to electricity supply from the battery unit and heats a heat exchange medium that exchanges heat with the battery unit; a changing mechanism or structure that changes a heat transfer capacity between the battery unit and the heat exchange medium; and a control device or controller that controls heating of the heat exchange medium by the heater and a change of the heat transfer capacity by the changing mechanism, in which the control device makes the heat transfer capacity when a temperature of the heat exchange medium does not reach a first temperature that is equivalent to a temperature of the battery unit while the heat exchange medium is heated by the heater smaller than the heat transfer capacity when the temperature of the heat exchange medium has reached the first temperature while the heat exchange medium is heated by the heater.

In this structure, when the temperature of the heat exchange medium does not reach the first temperature while the heat exchange medium is heated by the heater that is equivalent to the temperature of the battery unit, the heat transfer capacity between the battery unit and the heat exchange medium is reduced by controlling the changing mechanism using the controlling device. Since this suppresses the heat transfer from the battery unit to the heat exchange medium, delay in the heating the battery unit can be suppressed.

Then, after the temperature of the heat exchange medium reaches the first temperature, which is equivalent to the temperature of the battery unit, the heat transfer capacity between the battery unit and the heat exchange medium is increased by controlling the changing mechanism using the control device. Since the temperature of the heat exchange medium is already higher than the temperature (first temperature) of the battery unit at this time, even when the heat transfer capacity between the battery unit and the heat exchange medium is increased, the heat transfer from the battery unit to the heat exchange medium is hardly present, and the heat transfer from the heat exchange medium to the battery units is promoted conversely.

As described above, the temperature of the battery unit can be quickly heated by changing the heat transfer capacity between the battery unit and the heat exchange medium after the temperature of the heat exchange medium reaches the first temperature, which is equivalent to the temperature of the battery unit.

According to an embodiment, the changing mechanism switches, between a heat insulation mode that suppresses the exchanging heat with the battery unit and a heat transfer mode that promotes the exchanging heat with the battery unit, a heat exchange mode between the battery unit and the heat exchange medium, and the control device places the heat exchange mode in the heat insulation mode when the temperature of the heat exchange medium does not reach the first temperature while the heat exchange medium is heated by the heater, and the control device places the heat exchange mode in the heat transfer mode when the temperature of the heat exchange medium has reached the first temperature while the heat exchange medium is heated by the heater.

In this structure, the temperature of the battery unit can be quickly heated more easily by switching the heat exchange mode from the heat insulation mode to the heat transfer mode after the temperature of the heat exchange medium reaches the first temperature.

According to an embodiment, the control device controls the heating of the heat exchange medium by the heater and the change of the heat transfer capacity by the changing mechanism based on whether the heat exchange medium has reached the first temperature and whether the battery unit has reached a second temperature at which a decrease in an internal resistance of the battery unit is saturated.

When the internal resistance of the battery unit is high, for example, the battery unit cannot often drive the motor because the battery unit does not fully exercise the ability. Here, as the battery unit is charged or discharged, the battery unit is heated internally and rises in temperature. The internal resistance of the battery unit decreases as the temperature of the battery unit rises and is saturated when the temperature of the battery unit reaches the second temperature.

Therefore, to fully exercise the ability of the battery unit, the temperature of the battery unit is preferably raised to the second temperature quickly by using the internal heat generation of the battery unit. In addition, to effectively heat the battery unit, the temperature of the heat exchange medium is preferably raised to the first temperature quickly.

In this structure, the temperatures of the battery unit and the heat exchange medium can be effectively heated by checking whether the temperature of the heat exchange medium has reached the first temperature and whether the temperature of the battery unit has reached the second temperature.

According to an embodiment, if the temperature of the battery unit has reached the second temperature when the temperature of the heat exchange medium has reached the first temperature while the heat exchange medium is heated by the heater, the control device stops the electricity supply from the battery unit to the heater and switches the heat exchange mode from the heat insulation mode to the heat transfer mode.

In this structure, since the temperature of the heat exchange medium has already reached the first temperature, the temperature of the battery unit can be effectively raised by switching the heat exchange mode from the heat insulation mode to the heat transfer mode to promote the heat transfer from the heat exchange medium to the battery unit 10.

On the other hand, since the temperature of the battery unit has already reached the second temperature, no more electricity supply (discharging) from the battery unit to the heater is required to reduce the internal resistance of the battery unit. Accordingly, unnecessary power consumption of the battery unit can be eliminated by stopping the electricity supply from the battery unit to the heater.

According to an embodiment, if the temperature of the battery unit does not reach the second temperature when the temperature of the heat exchange medium has reached the first temperature while the heat exchange medium is heated by the heater, the control device does not stop the electricity supply from the battery unit to the heater and switches the heat exchange mode from the heat insulation mode to the heat transfer mode while making the electricity supply smaller than the electricity supply before the heat exchange medium reaches the first temperature.

In this structure, as in the embodiment described above, since the temperature of the heat exchange medium has already reached the first temperature, the temperature of the battery unit can be effectively raised by switching the heat exchange mode from the heat insulation mode to the heat transfer mode to promote the heat transfer from the heat exchange medium to the battery unit.

On the other hand, since the temperature of the battery unit has not reached the second temperature, the electricity supply (discharging) from the battery unit to the heater needs to be maintained without being stopped to reduce the internal resistance of the battery unit. However, since the heat transfer from the heat exchange medium to the battery unit is promoted in the heat transfer mode as described above, the electricity supply from the battery unit to the heater can be lower than that before the temperature of the heat exchange medium reaches the first temperature. This can raise the temperature of the battery unit to the second temperature while minimizing the power consumption of the battery unit.

According to an embodiment, if the temperature of the heat exchange medium does not reach the first temperature when the temperature of the battery unit has reached the second temperature while the heat exchange medium is heated by the heater, the control device starts electricity from an external power supply to the heater while keeping the heat exchange mode at the heat insulation mode.

In this structure, since the temperature of the battery unit has already reached the second temperature, no more electricity supply (discharging) from the battery unit to the heater is required to reduce the internal resistance of the battery unit.

On the other hand, since the temperature of the heat exchange medium has not reached the first temperature, the electricity supply from the battery unit or another power supply to the heater needs to be continued while the heat insulation mode is kept as the heat exchange mode. Accordingly, the electricity supply from the external power supply to the heater is started. This can suppress or stop the electricity supply from the battery unit to the heater. As described above, by using the help of the external power supply, the temperature of the heat exchange medium can be raised to the first temperature while the power consumption of the battery unit is suppressed.

According to an embodiment, each of the battery units includes a plurality of battery cells disposed side by side, and each of the changing mechanisms includes a heat transfer material disposed between adjacent battery cells of the plurality of battery cells, the heat transfer material exchanging heat with the heat exchange medium, and an area changing mechanism that changes the heat transfer capacity between each of the battery cells and the heat exchange medium by changing contact areas between the heat transfer material and the adjacent battery cells.

In this structure, the heat transfer capacity between the battery unit and the heat exchange medium can be easily changed.

According to an embodiment, the battery unit temperature management device includes a plurality of battery units, the battery unit being one of the plurality of battery units, a plurality of changing mechanisms provided to correspond to the battery units, the changing mechanism being one of the plurality of changing mechanisms, and a flow channel through which a heat exchange medium circulates so as to pass through the battery units, the heat exchange medium is disposed in the flow path and is heated by the heater common to the plurality of battery units, and the control device makes the heat transfer capacity between the battery unit farther from the heater common to the battery units and the heat exchange medium larger than the heat transfer capacity between the battery unit closer to the heater common to the battery units and the heat exchange medium.

The temperature of part of the heat exchange medium in contact with the battery unit farther from the common heater is likely to be lower than the temperature of part of the heat exchange medium in contact with the battery unit closer to the common heater. In this structure, the battery unit farther from the common heater is easier to exchange heat with the heat exchange medium than the battery unit closer to the common heater. This can evenly raise the temperatures of the plurality of battery units regardless of the distances from the common heater.

According to an embodiment, the battery unit temperature management device includes a plurality of battery units, the battery unit being one of the plurality of battery units, a plurality of changing mechanisms provided to correspond to the battery units, the changing mechanism being one of the plurality of changing mechanisms, and a flow channel through which the heat exchange medium circulates so as to pass through the battery units, the heat exchange medium is disposed in the flow path and is heated by the heater common to the plurality of battery units, and the control device causes at least a part of the plurality of battery units to alternately perform electricity supply to the heater common to the plurality of battery units.

In this structure, the internal heat generation of the battery unit can be promoted and the internal resistance of the battery unit can be efficiently reduced.

According to an embodiment, the battery unit temperature management device includes a plurality of battery units, the battery unit being one of the plurality of battery units, a plurality of changing mechanisms provided to correspond to the battery units, the changing mechanism being one of the plurality of changing mechanisms, and a flow channel through which the heat exchange medium circulates so as to pass through the battery units, the heat exchange medium is heated by a plurality of heaters corresponding to the plurality of battery units, the heater being one of the plurality of heaters, the control device controls how the heat exchange medium circulates through the flow path, and the control device does not circulate the heat exchange medium through the flow path when the heat exchange medium does not reach the first temperature while the heat exchange medium is heated by the heaters.

In this structure, the heat exchange medium can be quickly heated to the first temperature.

Advantage of the Disclosure

According to some embodiments of the present disclosure, the battery unit can be quickly heated.

BRIEF DESCRIPTION OF THE DRAWINGS

FIG. 1 is a schematic structural diagram of a battery unit temperature management device according to a first embodiment of the present disclosure.

FIG. 13 is a schematic structural diagram equivalent to FIG. 1 according to a modification of the first embodiment.

FIG. 14 is a schematic structure diagram of a battery unit temperature management device according to a second embodiment.

MODES FOR CARRYING OUT THE DISCLOSURE

Figure 2:
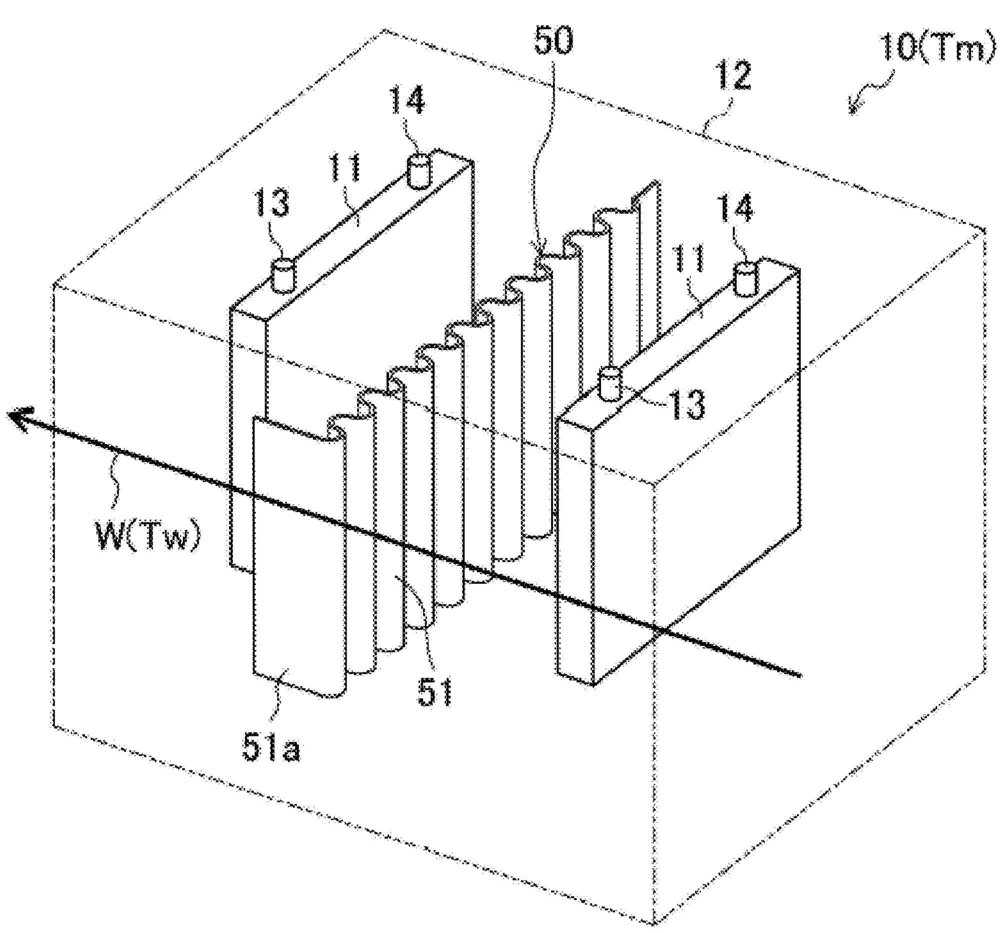
FIG. 2 is an exploded perspective view of a battery unit according to one embodiment of the present disclosure.

Embodiments of the present disclosure will be described in detail below with reference to the drawings. The following descriptions of preferred embodiments are essentially only examples and are not intended to limit the present disclosure, applications, or uses thereof.

First Embodiment (Basic Structure of a Battery Unit Temperature Management Device)

Figure 1:
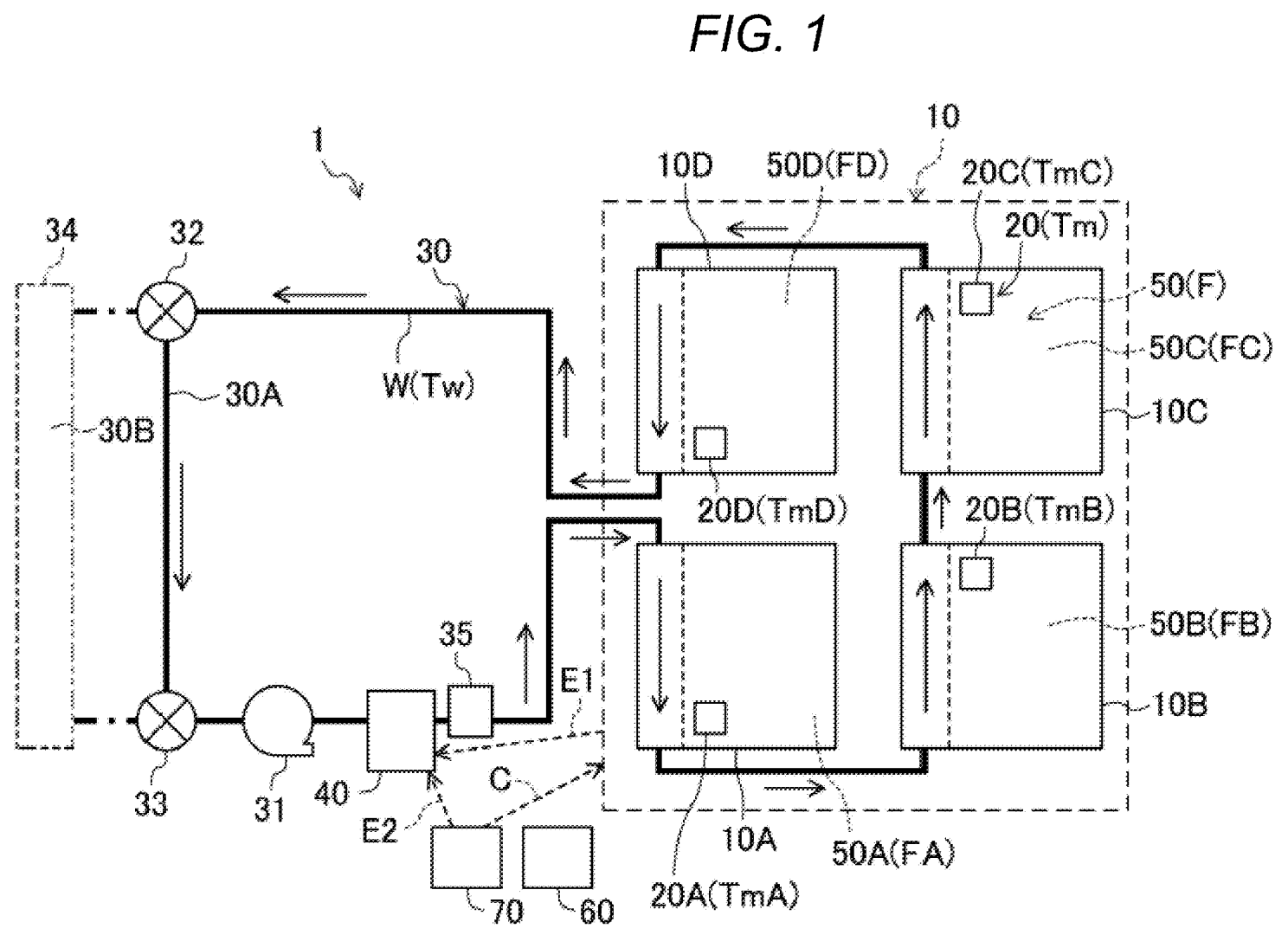

FIG. 1 is a schematic structural diagram of a battery unit temperature management device 1 according to a first embodiment of the present disclosure. The battery unit temperature management device 1 is installed in a vehicle such as an electric vehicle or a hybrid vehicle. In the embodiment, the vehicle is an electric vehicle and has a motor. The battery unit temperature management device 1 manages the temperatures of battery units (battery modules) 10, which will be described later.

The battery unit temperature management device 1 includes the plurality of battery units 10, a plurality of battery temperature sensors 20, a flow channel 30, a pump 31, valves 32 and 33, a heat exchanger 34, a medium temperature sensor 35, a heater 40, a plurality of changing mechanisms 50, and a control device 60.

The battery units 10 can be charged and discharged and are mainly used to drive a motor. The battery units 10 are, for example, lithium-ion batteries. The battery units 10 include a total of four battery units: a first battery unit 10A, a second battery unit 10B, a third battery unit 10C, and a fourth battery unit 10D.

The battery temperature sensors 20 are provided to correspond to the battery units 10 and detect the temperatures Tm of the battery units 10. The battery temperature sensors 20 include a total of four battery temperature sensors: a first battery temperature sensor 20A, a second battery temperature sensor 20B, a third battery temperature sensor 20C, and a fourth battery temperature sensor 20D. The first battery temperature sensor 20A is disposed near the first battery unit 10A and detects a temperature TmA of the first battery unit 10A. The second battery temperature sensor 20B is disposed near the second battery unit 10B and detects a temperature TmB of the second battery unit 10B. The third battery temperature sensor 20C is disposed near the third battery unit 10C and detects a temperature TmC of the third battery unit 10C. The fourth battery temperature sensor 20D is disposed near the fourth battery unit 10D and detects a temperature TmD of the fourth battery unit 10D.

A heat exchange medium W circulates through the flow channel 30. The heat exchange medium W flowing through the flow channel 30 passes beside the battery units 10 on the way. Since the heat exchange medium W passes beside the battery units 10, the heat exchange medium W exchanges heat with the battery units 10. The heat exchange medium W is, for example, motor cooling water.

Here, the battery units 10 are disposed in the flow direction (see the arrows in FIG. 1) in the flow channel 30. The battery units 10 are disposed in the flow channel 30 in the order of the first battery unit 10A, the second battery unit 10B, the third battery unit 10C, and the fourth battery unit 10D from the upstream side to the downstream side in the flow direction in the flow channel 30.

In the flow channel 30, the pump 31, the valves 32 and 33, the heat exchanger 34, the medium temperature sensor 35, and the heater 40 are disposed. The pump 31 is disposed on the upstream side of the battery units 10 in the flow channel 30 and supplies the heat exchange medium W to the battery units 10.

The valves 32 and 33 switch the flow of the heat exchange medium W in the flow channel 30. Specifically, the valves 32 and 33 switch the flow of the heat exchange medium W in the flow channel 30 between a bypass flow channel 30A that bypasses the heat exchanger 34 and a heat exchange flow channel 30B that passes through the heat exchanger 34.

The heat exchanger 34 is, for example, a radiator and cools the heat exchange medium W by using vehicle running wind. A fan may be disposed next to the heat exchanger 34. In the embodiment, the heat exchange medium W bypasses the heat exchanger 34 and passes through the bypass flow channel 30A. That is, the heat exchange medium W is not cooled by the heat exchanger 34.

The medium temperature sensor 35 detects a temperature Tw of the heat exchange medium W in the flow channel 30.

The heater 40 is an electric heater and is disposed on the upstream side of the battery units 10 in the flow channel 30. The heater 40 is operated by electricity supply (discharging) E1 from the battery units 10. The heater 40 heats the heat exchange medium W. The heater 40 is common to the plurality of battery units 10. The heat exchange medium W is used as a heating medium for heating the battery units 10.

The changing mechanisms 50 are provided to correspond to the battery units 10 and change the heat transfer capacities between the battery units 10 and the heat exchange medium W. The changing mechanisms 50 include a total of four changing mechanisms: a first changing mechanism 50A, a second changing mechanism 50B, a third changing mechanism 50C, and a fourth changing mechanism 50D. The first changing mechanism 50A changes the heat transfer capacity between the first battery unit 10A and the heat exchange medium W. The second changing mechanism 50B changes the heat transfer capacity between the second battery unit 10B and the heat exchange medium W. The third changing mechanism 50C changes the heat transfer capacity between the third battery unit 10C and the heat exchange medium W. The fourth changing mechanism 50D changes the heat transfer capacity between the fourth battery unit 10D and the heat exchange medium W.

Here, the heat transfer capacity means the ease of heat exchange between each of the battery units 10 and the heat exchange medium W. The larger the heat transfer capacity, the easier heat exchange. The smaller the heat transfer capacity, the harder heat exchange. The heat transfer capacity is, for example, a heat transfer coefficient or a thermal conductivity. Details of the changing mechanisms 50 will be described later.

The control device 60 controls the heating of the heat exchange medium W by the heater 40. In addition, the control device 60 controls, for each of the battery units 10, the change of the heat transfer capacity between each of the battery units 10 and the heat exchange medium W by using the changing mechanism 50.

In addition, the changing mechanism 50 can switch the heat exchange mode between each of the battery units 10 and the heat exchange medium W between a heat insulation mode that suppresses heat exchange and a heat transfer mode that promotes heat exchange. The heat transfer capacities between the battery units 10 and the heat exchange medium W in the heat insulation mode are relatively smaller than those in the heat transfer mode. In contrast, the heat transfer capacities between the battery units 10 and the heat exchange medium W in the heat transfer mode are relatively larger than those in the heat insulation mode. Specific control forms of the control device 60 will be described later. The control device 60 includes, for example, a microcomputer and programs.

The control device 60 controls the circulation of the heat exchange medium W in the flow channel 30. Specifically, the control device 60 controls the flowrate and the pressure of the heat exchange medium W flowing through the flow channel 30 by controlling the discharge pressure and the discharge rate of the pump 31 and the opening and closing of the valves 32 and 33.

The heater 40 also operates by electricity supply E2 from an external power supply 70 (such as, for example, an electric station). It should be noted that the external power supply 70 is mainly used for external charging C of the battery unit 10. The temperature Tm of the battery unit 10 needs to be raised to some extent before the external charging C of the battery unit 10 is performed by the external power supply 70.

(Battery Unit)

Figure 3:
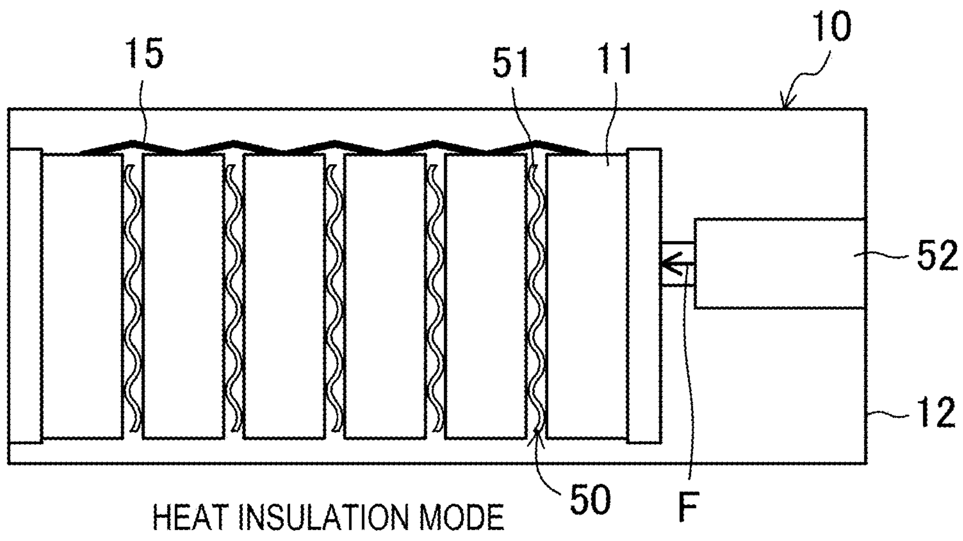
FIG. 3 is a sectional view of the battery unit in a heat insulation mode according to one embodiment of the present disclosure.
Figure 4:
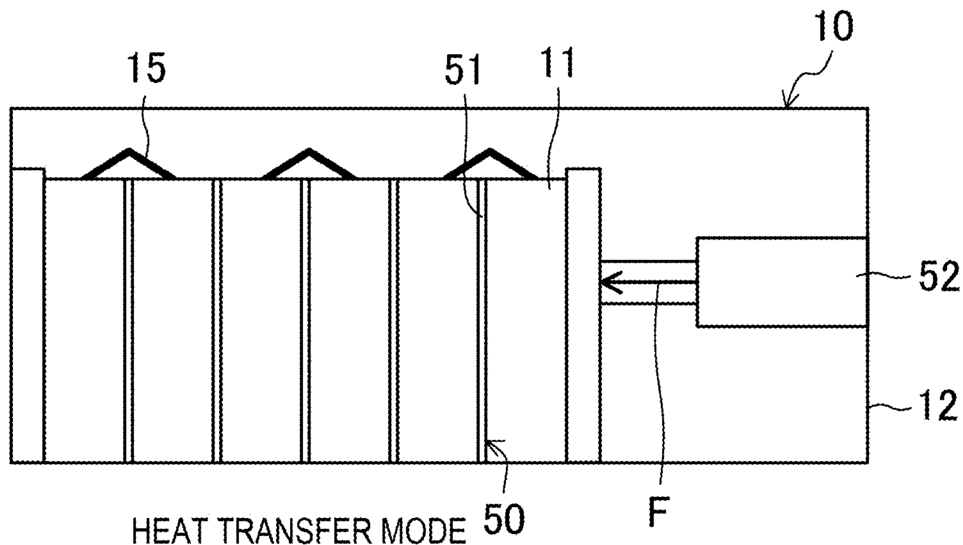
FIG. 4 is a sectional view of the battery unit in a heat transfer mode according to one embodiment of the present disclosure.

FIG. 2 is an exploded perspective view of the battery unit 10. FIGS. 3 and 4 are cross-sectional views of the battery unit 10. As illustrated in FIGS. 2 to 4, the battery unit 10 includes a plurality of battery cells 11 disposed side by side. The battery cells 11 are housed in a housing 12. The battery cells 11 have a flat substantially-rectangular-parallelepiped shape and are disposed such that the surfaces with a larger area are stacked together. A positive terminal 13 and a negative terminal 14 are provided on one side surface of the battery cell 11. As illustrated in FIGS. 3 and 4, the battery cells 11 are electrically connected to each other by a busbar spring 15.

As illustrated in FIGS. 2 to 4, the changing mechanism 50 includes heat transfer materials 51 and an electromagnetic solenoid 52 as an area changing mechanism. Each of the heat transfer materials 51 is disposed between adjacent battery cells 11. The heat transfer material 51 is formed in a corrugated plate shape. The heat transfer material 51 is made of a material such as, for example, copper or aluminum.

The heat transfer material 51 changes in shape from a corrugated plate shape to a flat plate shape when receiving an external force in the normal direction of the surface, that is, in the direction in which the battery cells 11 are arranged. In addition, the heat transfer material 51 has a heat transfer surface 51*a* for exchanging heat with the heat exchange medium W that passes beside the battery unit 10.

The electromagnetic solenoid 52 is one type of pressing mechanism and applies an external force to the plurality of battery cells 11 in the direction in which the battery cells 11 are arranged. The control device 60 performs switching between the pulling direction and the extending direction of the electromagnetic solenoid 52. When the electromagnetic solenoid 52 is moved in the pulling direction, the plurality of battery cells 11 are not restrained. When the electromagnetic solenoid 52 is moved in the extending direction, the plurality of battery cells 11 are restrained.

The force by which the electromagnetic solenoid 52 of the changing mechanism 50 restrains the plurality of battery cells 11 will be referred to below as a restraint force F. It is assumed that the restraint force of the first changing mechanism 50A is FA, the restraint force of the second changing mechanism 50B is FB, the restraint force of the third changing mechanism 50C is FC, and the restraint force of the fourth changing mechanism 50D is FD.

Although the details are not described later, the electromagnetic solenoid 52 changes the heat transfer capacity between the battery cells 11 and the heat exchange medium W by changing the contact area between the heat transfer materials 51 and the battery cells 11. When the electromagnetic solenoid 52 is moved in the pulling direction, the heat exchange mode is the heat insulation mode. When the electromagnetic solenoid 52 is moved in the extending direction, the heat exchange mode is the heat transfer mode.

FIG. 3 illustrates the case in which the changing mechanism 50 is in the heat insulation mode (when the electromagnetic solenoid 52 is moved in the pulling direction). FIG. 4 illustrates the case in which the changing mechanism 50 is in the heat transfer mode (when the electromagnetic solenoid 52 is moved in the extending direction). As illustrated in FIG. 3, since the heat transfer materials 51 have a corrugated plate shape, air layers are formed between the battery cells 11 when the electromagnetic solenoid 52 is moved in the pulling direction. In addition, when the electromagnetic solenoid 52 is moved in the pulling direction, the heat transfer materials 51 and the battery cells 11 are not close to each other.

That is, when the electromagnetic solenoid 52 is moved in the pulling direction, the contact area between the heat transfer materials 51 and the battery cells 11 is smaller and the heat transfer materials 51 and the battery cells 11 are in the heat insulation state. This suppresses the heat exchange between the battery unit 10 (battery cells 11) and the heat exchange medium W (heat insulation mode).

As illustrated in FIG. 4, when the electromagnetic solenoid 52 is moved in the extending direction, since an external force is applied to the plurality of battery cells 11 and the heat transfer materials 51 are deformed to flat plate shapes, no air layers are formed in the gaps between the battery cells 11. In addition, when the electromagnetic solenoid 52 is moved in the extending direction, the heat transfer materials 51 and the battery cells 11 are close to each other.

That is, when the electromagnetic solenoid 52 is moved in the extending direction, the contact area between the heat transfer materials 51 and the battery cells 11 is larger and the heat transfer materials 51 and the battery cells 11 are in the heat transfer state. This promotes the heat exchange between the battery unit 10 (battery cells 11) and the heat exchange medium W (heat transfer mode).

It should be noted that the changing mechanism 50 may adopt, as the heat exchange mode, an intermediate mode between the heat insulation mode (the electromagnetic solenoid 52 is moved in the pulling direction as illustrated in FIG. 3) and the heat transfer mode (the electromagnetic solenoid 52 is moved in the extending direction as illustrated in FIG. 4). This can fine-tune the heat transfer capacity between the battery cells 11 and the heat exchange medium W.

(Temperature of the Heat Exchange Medium)

In an electric vehicle, when the temperature of the battery unit 10 drops in cold weather, the electromotive force of the battery unit 10 may reduce, possibly reducing the running performance of the vehicle. To prevent such a situation, the battery unit 10 needs to be quickly heated (warmed up) by the heat exchange medium W heated by the heater 40.

By the way, when the temperature Tw of the heat exchange medium W that is being heated by the heater 40 does not reach a first temperature T1, which is equivalent to the temperature of the battery unit 10, the heating of the battery unit 10 may be delayed because heat transfers from the battery unit 10 to the heat exchange medium W. When the heating of the battery unit 10 is delayed, the performance of the battery unit 10 cannot be fully exhibited, especially in cold weather.

Accordingly, the battery unit 10 needs to be quickly heated. For that purpose, the temperature Tw of the heat exchange medium W needs to quickly reach the first temperature T1. When the temperature Tw of the heat exchange medium W reaches the first temperature T1, the heat exchange medium W can heat the battery unit 10.

It should be noted that the first temperature T1 may include a temperature that is completely the same as the temperature Tm of the battery unit 10 and a temperature deviated from the temperature Tm of the battery unit 10 by approximately ±3° C. (T1 nearly equals Tm).

(Temperature of the Battery Unit)

Figure 5:
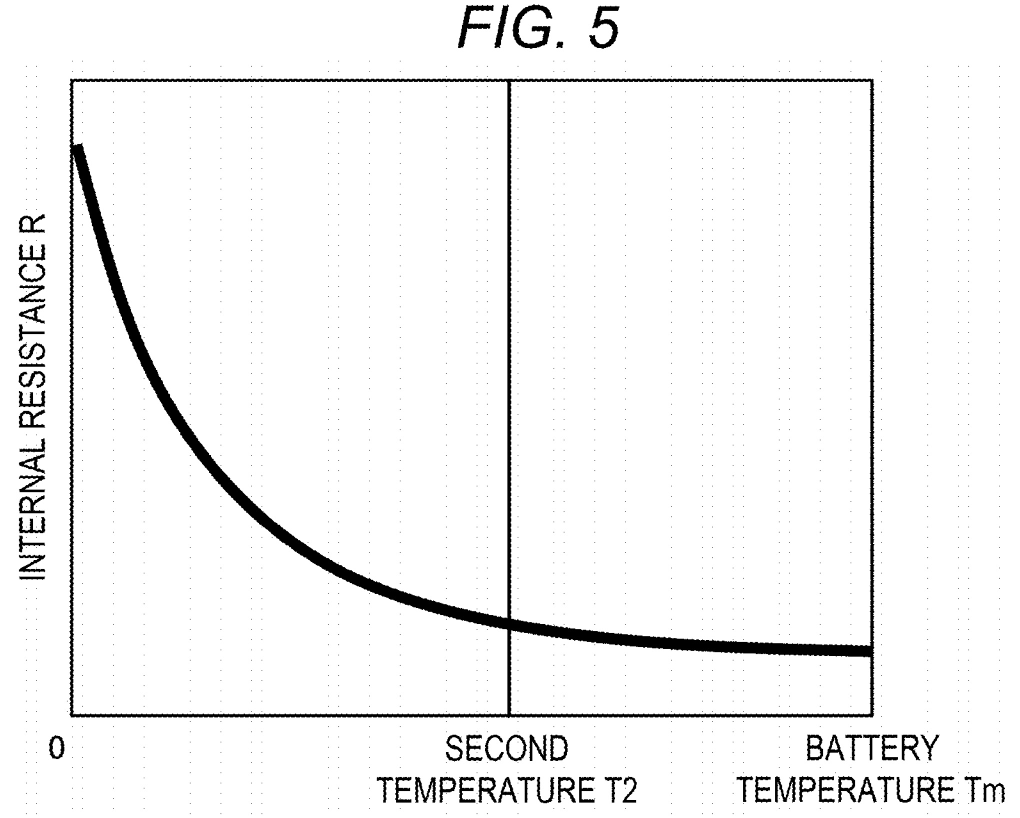
FIG. 5 is a graph illustrating the relationship between the temperature and the internal resistance of the battery unit according to one embodiment of the present disclosure.

FIG. 5 is a graph illustrating the relationship between the temperature Tm (° C.) and the internal resistance R of the battery unit 10. When the internal resistance R of the battery unit 10 is high, for example, the battery unit 10 cannot often drive the motor because the battery unit 10 does not fully exercise the ability.

Here, with the electricity supply (discharging) E1 from the battery unit 10 to the heater 40, the battery unit 10 internally generates heat and rises in temperature. As illustrated in FIG. 5, the internal resistance R of the battery unit 10 decreases as the temperature Tm of the battery unit 10 rises and is saturated when the temperature Tm of the battery unit 10 reaches the second temperature T2. That is, the second temperature T2 is the temperature at which decrease in the internal resistance R in the battery unit 10 is saturated. It should be noted that, even when the temperature Tm of the battery unit 10 does not reach the second temperature T2, it is possible to perform the electricity supply E1 from the battery unit 10 to the heater 40.

(Management of the Temperatures of the Battery Unit and the Heat Exchange Medium)

The management of the temperature Tm of the battery unit 10 and the temperature Tw of the heat exchange medium W will be described. The control device 60 controls the heating of the heat exchange medium W by using the heater 40 and changes of the heat transfer capacity between the battery unit 10 and the heat exchange medium W by using the changing mechanism 50, based on whether the temperature Tw of the heat exchange medium W has reached the first temperature T1 and whether the temperature Tm of the battery unit 10 has reached the second temperature T2.

When the temperature Tw of the heat exchange medium W does not reach the first temperature T1 while the heat exchange medium W is heated by the heater 40, the control device 60 makes the heat transfer capacity between the battery unit 10 and the heat exchange medium W smaller than the heat transfer capacity when the temperature Tw of the heat exchange medium W reaches the first temperature T1.

Specifically, when the temperature Tw of the heat exchange medium W has not reached the first temperature T1 while the heat exchange medium W is heated by the heater 40, the control device 60 places the heat exchange mode between the battery unit 10 and the heat exchange medium W in the heat insulation mode (see FIG. 3). On the other hand, when the temperature Tw of the heat exchange medium W reaches the first temperature T1 while the heat exchange medium W is heated by the heater 40, the control device 60 places the heat exchange mode between the battery unit 10 and the heat exchange medium W in the heat transfer mode (see FIG. 4).

(Normal Degradation and High Rate Degradation)

Figure 6:
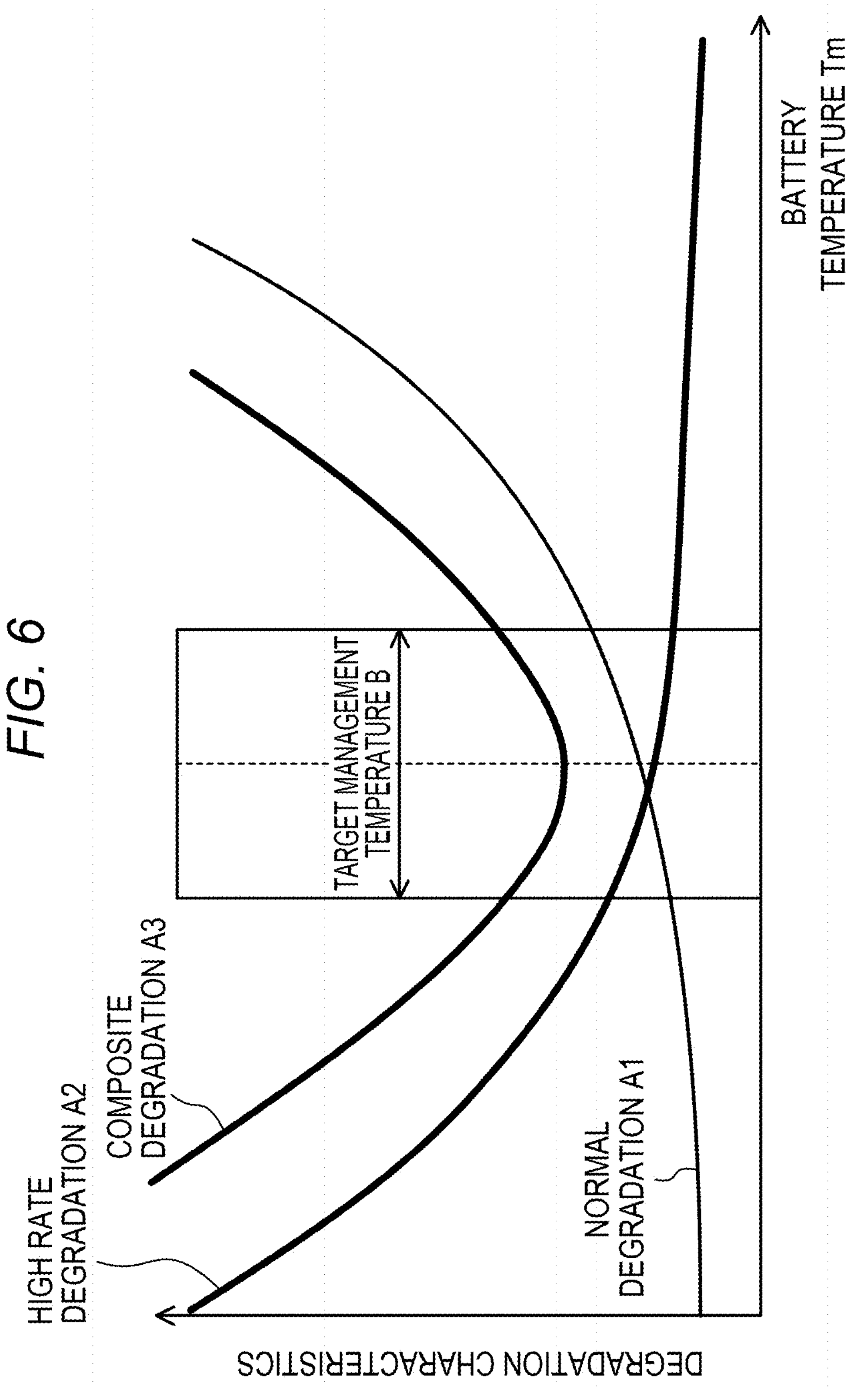
FIG. 6 is a graph illustrating the relationship between the temperature and the degradation characteristics of the battery unit according to one embodiment of the present disclosure.

FIG. 6 is a graph illustrating the relationship between the temperature Tm (° C.) and degradation characteristics of the battery unit 10. The normal degradation A1 of the battery unit 10 progresses as the temperature Tm of the battery unit 10 is higher, regardless of the driving state of the vehicle or the charging and discharging state of the battery unit 10. On the other hand, when the battery unit 10 is charged or discharged at a high rate (fast), high rate degradation A2 occurs in addition to the normal degradation A1. The high rate degradation A2 progresses as the temperature Tm of the battery unit 10 is lower. That is, composite degradation A3 obtained by combining the normal degradation A1 with the high rate degradation A2 has a local minimum value.

Accordingly, when the battery unit 10 is charged or discharged at a low (normal) rate, the temperature Tm of the battery unit 10 only needs to be set to a low temperature. However, when the battery unit 10 is charged or discharged at a high rate, the temperature Tm of the battery unit 10 needs to be fine-tuned so as to fall within the range of an intermediate target management temperature B. That is, when the battery unit 10 is charged or discharged at a high rate, the temperature management of the battery unit 10 becomes difficult.

(Temperature Rising Pattern of the Battery Unit and the Heat Exchange Medium)

Figure 7:
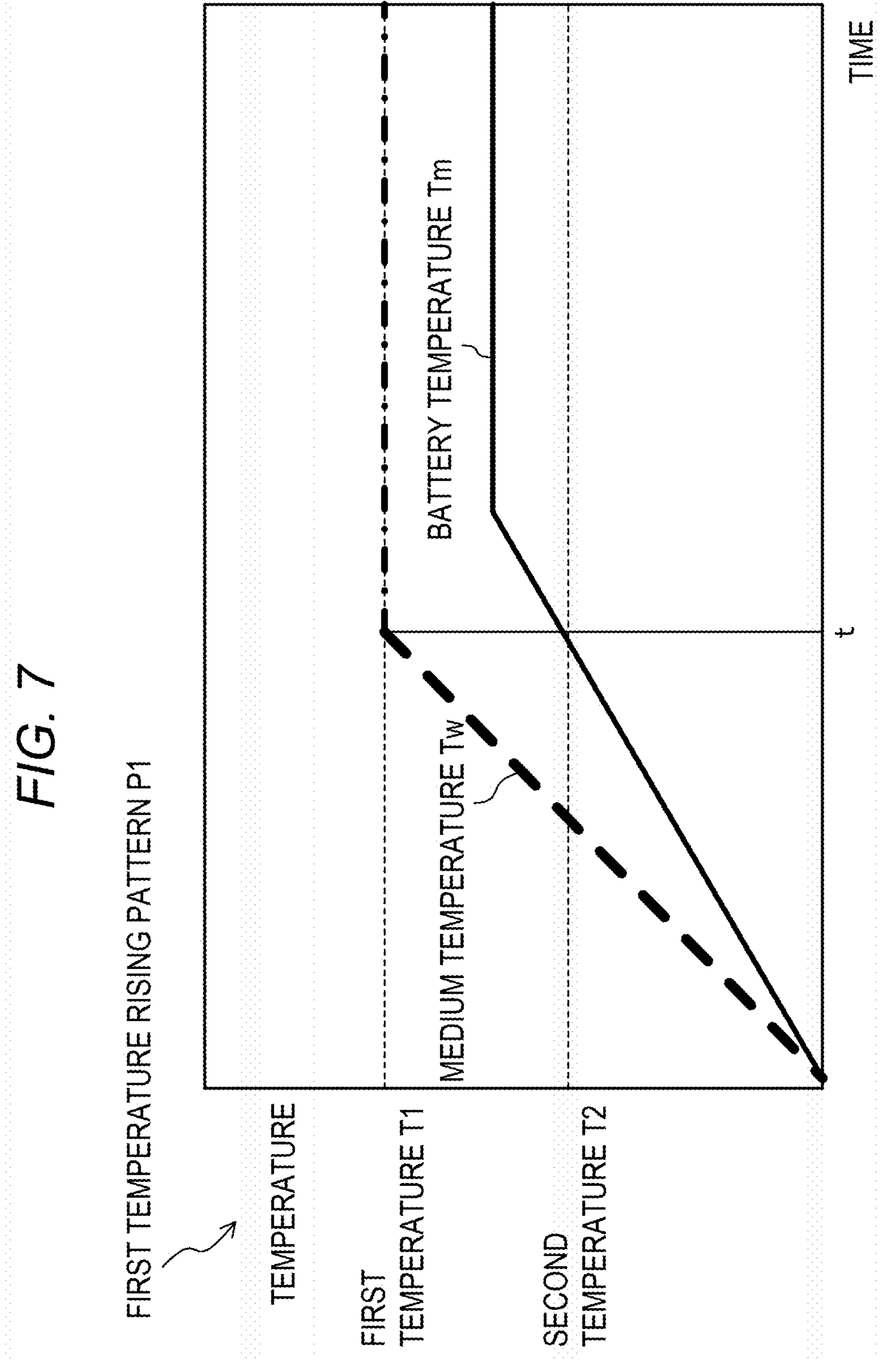
FIG. 7 is a graph illustrating a first temperature rising pattern of the battery unit and a heat exchange medium according to one embodiment of the present disclosure.
Figure 8:
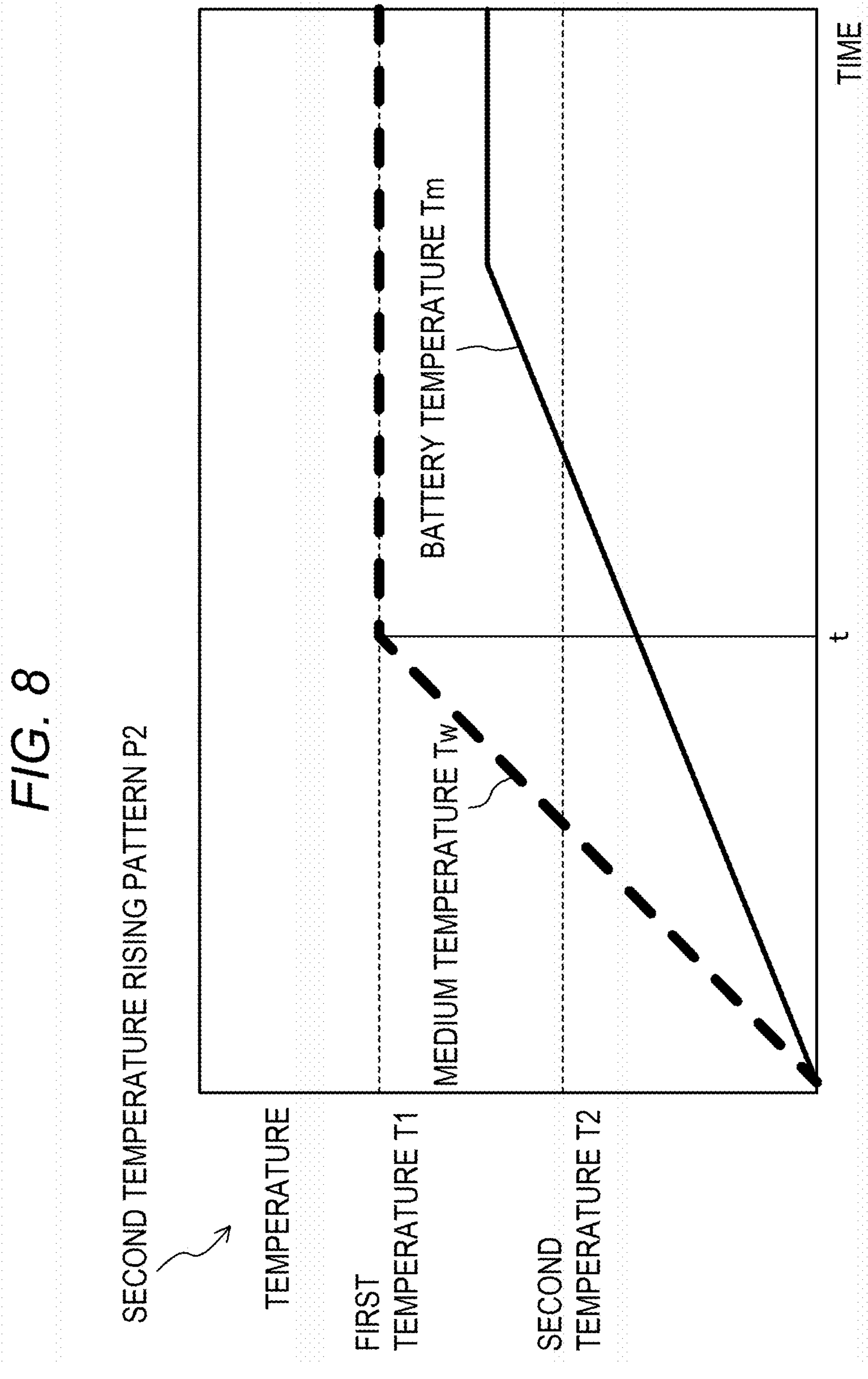
FIG. 8 is a graph illustrating a second temperature rising pattern of the battery unit and the heat exchange medium according to one embodiment of the present disclosure.
Figure 9:
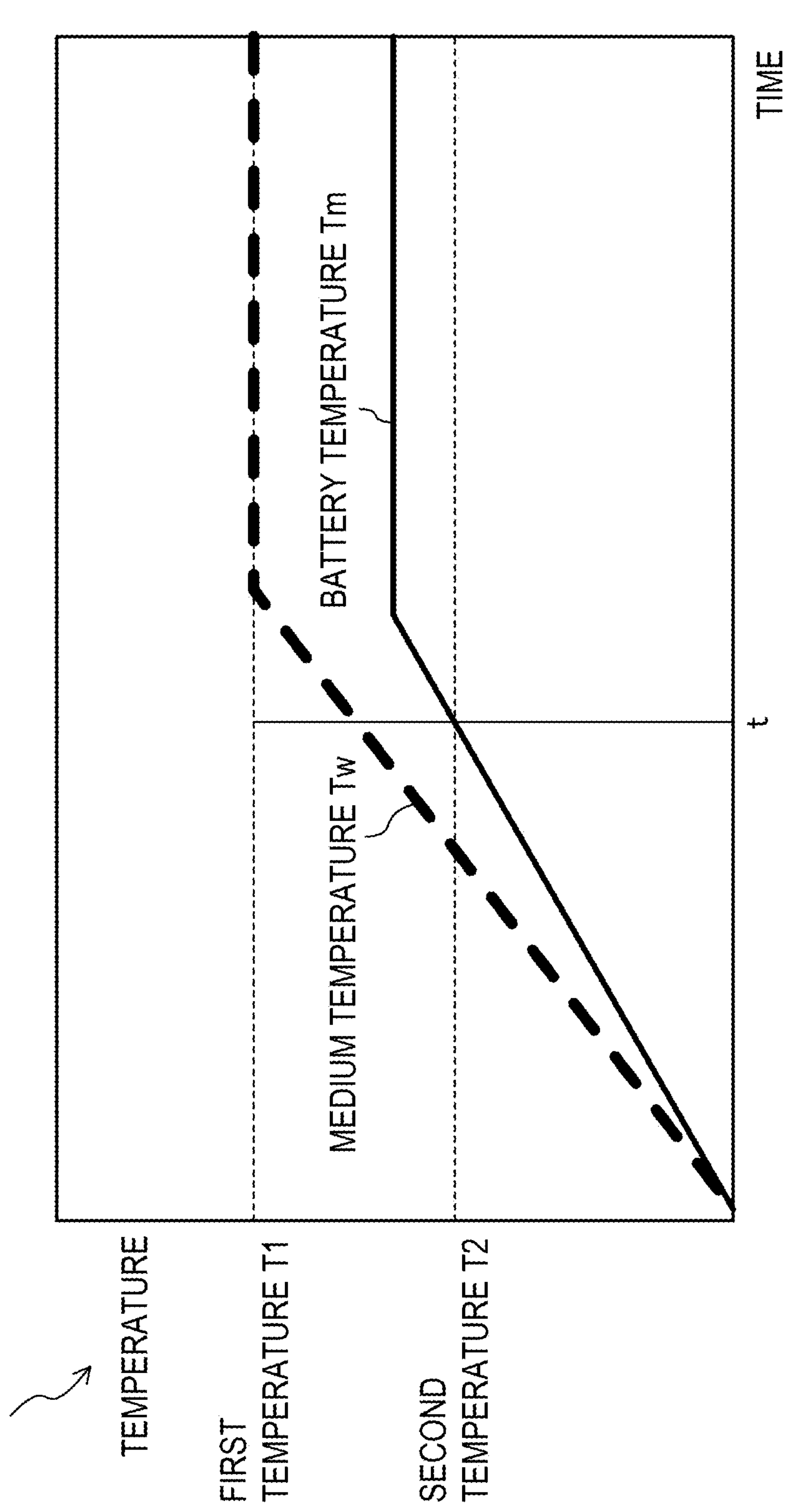
FIG. 9 is a graph illustrating a third temperature rising pattern of the battery unit and the heat exchange medium according to one embodiment of the present disclosure.

FIG. 7 is a graph illustrating a first temperature rising pattern P1 of the battery unit 10 and the heat exchange medium W. FIG. 8 is a graph illustrating a second temperature rising pattern P2 of the battery unit 10 and the heat exchange medium W. FIG. 9 is a graph illustrating a third temperature rising pattern P3 of the battery unit 10 and the heat exchange medium W. In FIGS. 7 to 9, the horizontal axes represent the time and the vertical axes represent the temperature (° C.).

As illustrated in FIG. 7, in the first temperature rising pattern P1, at time t at which the temperature Tw of the heat exchange medium W reaches the first temperature T1 while the heat exchange medium W is heated by the heater 40, the temperature Tm of the battery unit 10 already reaches the second temperature T2. In this case, the control device 60 stops the electricity supply E1 from the battery unit 10 to the heater 40 and switches the heat exchange mode from the heat insulation mode (see FIG. 3) to the heat transfer mode (see FIG. 4).

As illustrated in FIG. 8, in the second temperature rising pattern P2, at time t at which the temperature Tw of the heat exchange medium W reaches the first temperature T1 while the heat exchange medium W is heated by the heater 40, the temperature Tm of the battery unit 10 does not reach the second temperature T2. In this case, the control device 60 does not stop the electricity supply E1 from the battery unit 10 to the heater 40 and makes the electricity supply E1 less than that before (before time t) the temperature Tw of the heat exchange medium W reaches the first temperature T1. Specifically, the control device 60 performs the electricity supply E1 from the battery unit 10 to the heater 40 so as to keep (but not raise) the temperature of the heat exchange medium W. Furthermore, the control device 60 switches the heat exchange mode from the heat insulation mode (see FIG. 3) to the heat transfer mode (see FIG. 4).

As illustrated in FIG. 9, in the third temperature rising pattern P3, at time t at which the temperature Tm of the battery unit 10 reaches the second temperature T2 while the heat exchange medium W is heated by the heater 40, the temperature Tw of the heat exchange medium W does not reach the first temperature T1. In this case, the control device 60 maintains the heat exchange mode in the heat insulation mode (see FIG. 3). The control device 60 maintains the electricity supply E1 from the battery unit 10 to the heater 40. Furthermore, the control device 60 starts the electricity supply E2 from the external power supply 70 to the heater 40.

Figure 10:
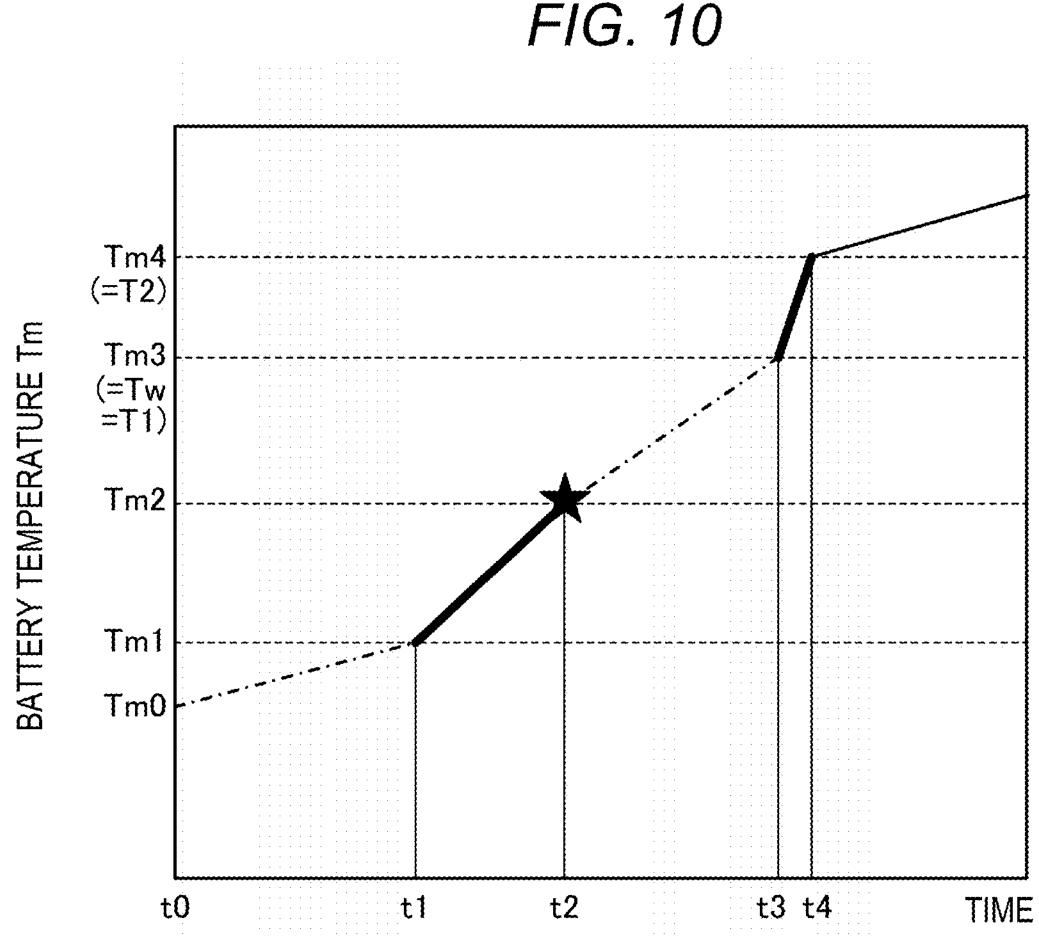
FIG. 10 is a graph illustrating an example of a temperature rising form of the battery unit and the heat exchange medium according to one embodiment of the present disclosure.

FIG. 10 is a graph illustrating an example of a temperature rising form of the battery unit 10 and the heat exchange medium W. In FIG. 10, the horizontal axis represents the time, and the vertical axis represents the temperature Tm (° C.) inside the battery unit 10. At time to, the temperature of the battery unit Tm is Tm0. At time t0, the electricity supply (discharging) E1 from the battery unit 10 to the heater 40 starts. It should be noted that the heat exchange mode is the heat insulation mode (see FIG. 3) at time t0.

At time t1, the temperature Tm of the battery unit 10 rises to Tm1. When the temperature Tm of the battery unit 10 rises to Tm1, the external charging C of the battery unit 10 by the external power supply 70 becomes possible. At time t1, the electricity supply E1 from the battery unit 10 to the heater 40 stops. Instead, the electricity supply E2 from the external power supply 70 to the heater 40 starts at time t1. At the same time, at time t1, the external power supply 70 starts the external charging C of the battery unit 10 at a high rate.

Here, since the temperature Tm (Tm1) of the battery unit 10 is still low at time t1, when the external power supply 70 performs the external charging C of the battery unit 10 at a high rate, the high rate degradation of the battery unit 10 may occur. However, the high rate degradation is prevented by discharging the battery unit 10 at a high rate described later.

At time t2, the temperature Tm of the battery unit 10 rises to Tm2. At time t2, the external power supply 70 stops the external charging C of the battery unit 10 at a high rate. At the same time, the electricity supply (discharging) E1 from the battery unit 10 to the heater 40 starts at time t2 at the rate at which the external power supply 70 performs the external charging C of the battery unit 10 as described above. This prevents the high rate degradation of the battery unit 10.

At time t3, the temperature Tm of the battery unit 10 rises to Tm3. In addition, at time t3, the temperature Tw of the heat exchange medium W reaches Tm3, which is the same as the temperature Tm of the battery unit 10. That is, at time t3, both the temperature Tw of the heat exchange medium W and the temperature Tm (Tm3) of the battery unit 10 reach the first temperature T1. When the temperature Tw of the heat exchange medium W reaches the first temperature T1, the heat exchange medium W can heat the battery unit 10.

At time t3, the electricity supply (discharging) E1 from the battery unit 10 to the heater 40 is stopped. In addition, at time t3, the electricity supply E2 from the external power supply 70 to the heater 40 is maintained so as to keep the heat exchange medium W warm. At the same time, at time t3, the external power supply 70 resumes the external charging C of the battery unit 10 at a high rate.

Since the temperature Tm (Tm3) of the battery unit 10 rises to some extent at time t3, even when the external power supply 70 performs the external charging C of the battery unit 10 at a high rate, the high rate degradation of the battery unit 10 is unlikely to occur. Furthermore, since this enables higher rate (faster) external charging C, the rising rate of the temperature Tm of the battery unit 10 can be increased.

At time t4, the temperature Tm of the battery unit 10 rises to Tm4. At this time, the decrease in the internal resistance R of the battery unit 10 is saturated (see FIG. 5). That is, at time t4, the temperature Tm (Tm4) of the battery unit 10 is the second temperature T2. At time t4, the heat exchange mode is switched from the heat insulation mode (see FIG. 3) to the heat transfer mode (see FIG. 4). This causes the heat exchange medium W to start heating the battery unit 10.

(Method of Heating the Battery Unit and the Heat Exchange Medium)

Figure 11:
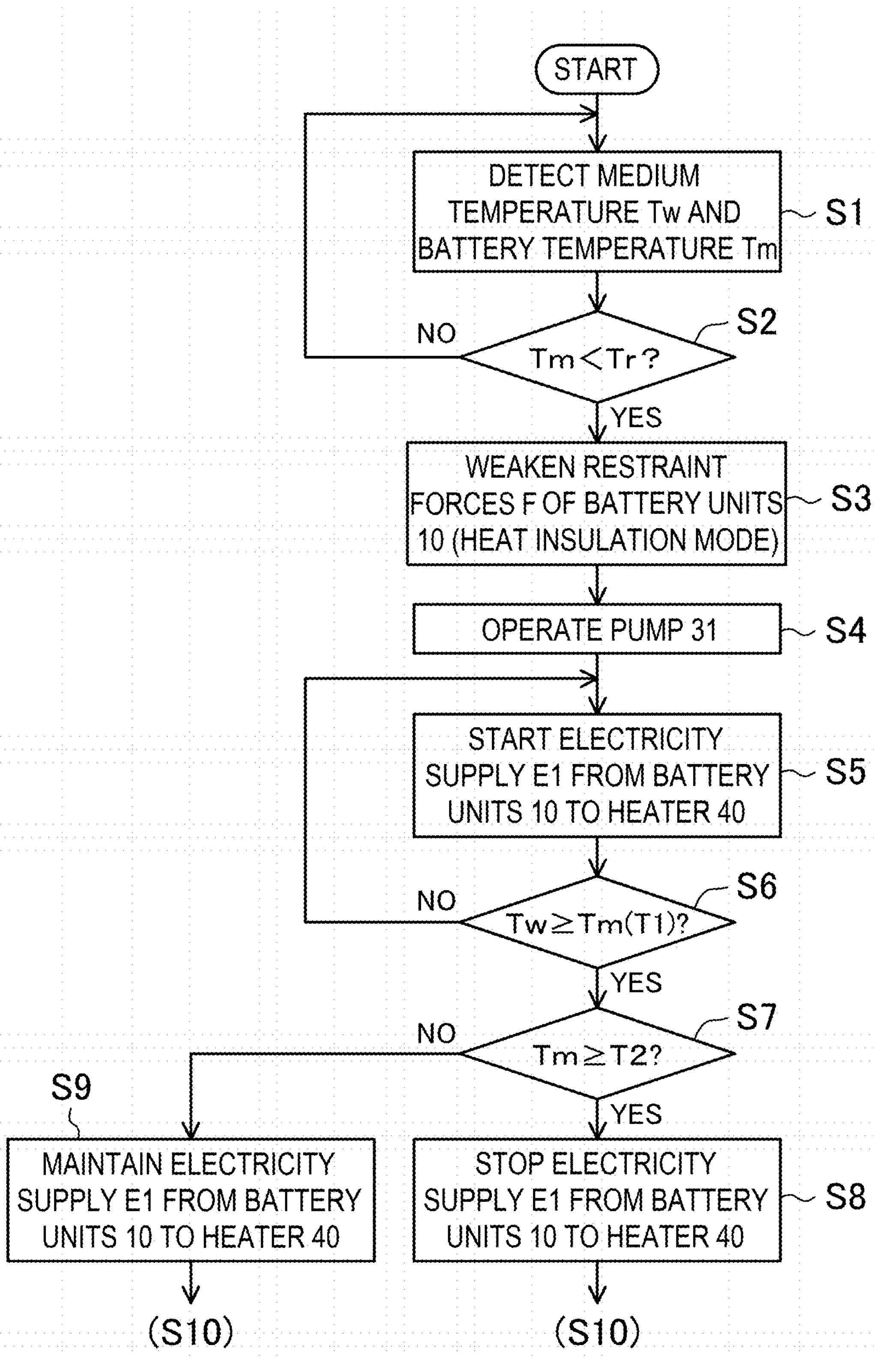
FIG. 11 is a flowchart illustrating an example of a control form of the battery unit temperature management device according to the first embodiment (start of heating of the temperature of the battery units by using the heat exchange medium) according to one embodiment of the present disclosure.

FIG. 11 is a flowchart illustrating an example of the control form of the battery unit temperature management device 1 until the heat exchange medium W starts the heating of the battery unit 10. First, in step 1, the medium temperature sensor 35 detects the temperature Tw of the heat exchange medium W. In addition, in step S1, the battery temperature sensors 20 (the first battery temperature sensor 20A, the second battery temperature sensor 20B, the third battery temperature sensor 20C, and the fourth battery temperature sensor 20D) detect the temperatures Tm (the temperatures TmA, TmB, TmC, and TmD) of the battery units 10 (the first battery unit 10A, the second battery unit 10B, the third battery unit 10C, and the fourth battery unit 10D).

Next, in step S2, it is determined whether the temperature Tm of each of the battery units 10 is less than a predetermined temperature Tr (Tm<Tr). When Tm<Tr, the processing proceeds to step S3. When Tm Tr, the processing returns to the start because the battery units do not need to be heated (warmed up).

Next, in step S3, the changing mechanisms 50 (the first changing mechanism 50A, the second changing mechanism 50B, the third changing mechanism 50C, and the fourth changing mechanism 50D) corresponding to the battery units 10 are controlled to set the heat exchange mode to the heat insulation mode (see FIG. 3). Specifically, the electromagnetic solenoids 52 are moved in the pulling direction to the maximum by minimizing the restraint forces F (restraint forces FA, FB, FC, and FD) of the electromagnetic solenoids 52 of the changing mechanisms 50.

Next, in step S4, the pump 31 is operated to circulate the heat exchange medium W through the flow channel 30.

Next, in step S5, the electricity supply E1 from the battery units 10 to the heater 40 is started. At this time, the electricity supply E1 to the heater 40 is performed by the first battery unit 10A, the second battery unit 10B, the third battery unit 10C, and the fourth battery unit 10D in this order.

Next, in step S6, it is determined whether the temperature Tw of the heat exchange medium W is equal to or larger than the temperatures Tm (that is, the first temperatures T1) of the battery units 10 (Tw Tm (T1)). When Tw Tm (T1), the processing proceeds to step S7. When Tw<Tm (T1), the processing returns to step S5.

Next, in step S7, it is determined whether the temperatures Tm of the battery units 10 are equal to or higher than the second temperature T2 (Tm T2) at which the decrease in the internal resistance R is saturated. When Tm T2, the processing proceeds to step S8 and stops the heater 40 by stopping the electricity supply E1 from the battery units 10 to the heater 40, and the processing proceeds to step S10. When Tm<T2, the processing proceeds to step S9, the electricity supply E1 from the battery units 10 to the heater 40 is maintained so as to keep the heat exchange medium W warm, and the processing proceeds to step S10.

Figure 12:
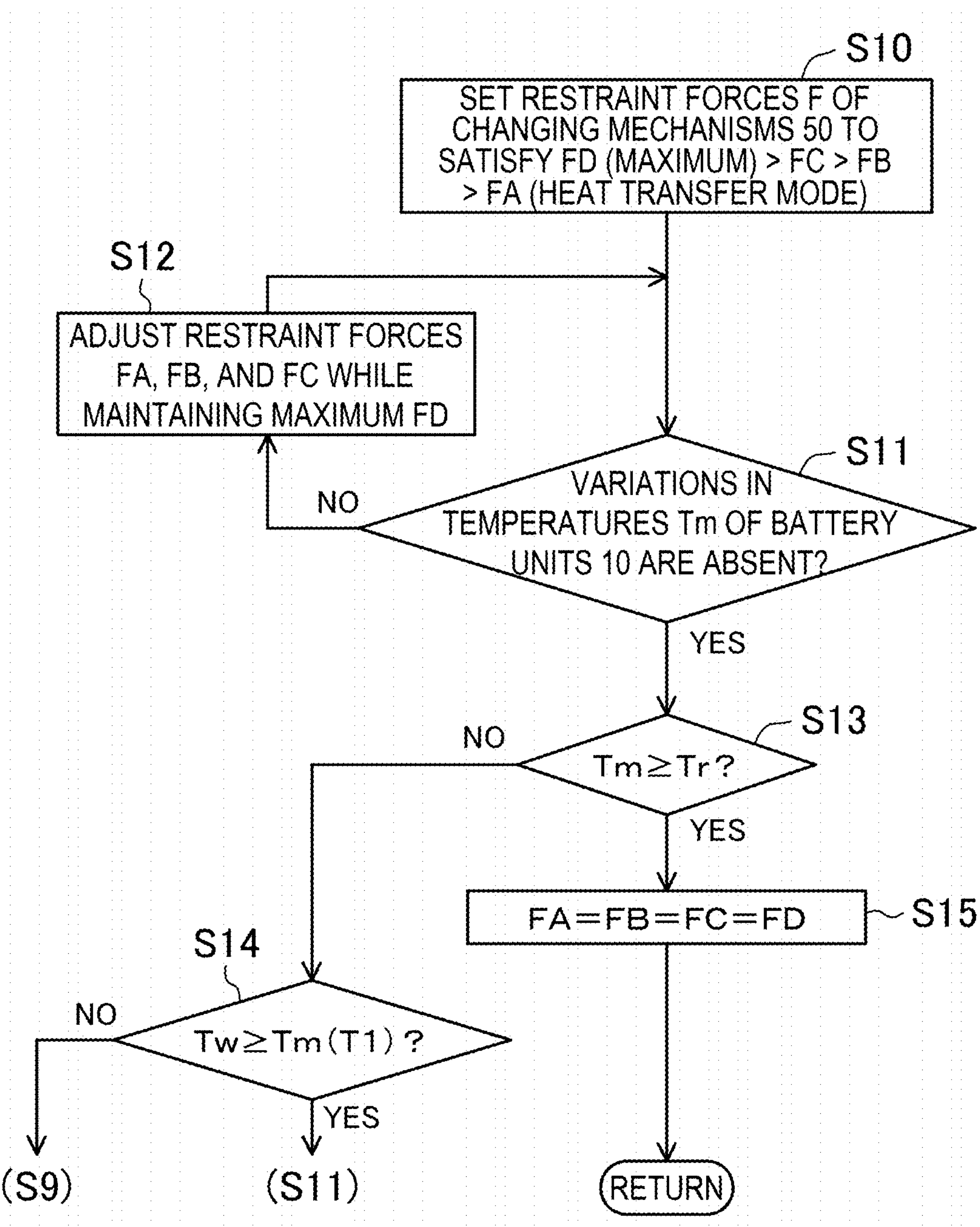
FIG. 12 is a flowchart illustrating the example of the control form of the battery unit temperature management device according to the first embodiment (uniformization of the temperature rises of the battery units) according to one embodiment of the present disclosure.

FIG. 12 is a flowchart illustrating an example of the control form of the battery unit temperature management device 1 and illustrating the uniformization of heating of the battery units 10.

In step S10, the heat exchange mode is switched from the heat insulation mode to the heat transfer mode (see FIG. 4). Specifically, the electromagnetic solenoids 52 of the changing mechanisms 50 are moved in the extending direction to increase the restraint forces F. At this time, the restraint force FD of the fourth changing mechanism 50D is maximized (the electromagnetic solenoid 52 is moved in the extending direction to the maximum). Furthermore, the magnitudes of the restraint forces F of the changing mechanisms 50 (50A, 50B, 50C, and 50D) are set to satisfy FD>FC>FB>FA. That is, the heat transfer capacities between the heat exchange medium W and the battery units 10 increase in the order of the fourth battery unit 10D, the third battery unit 10C, the second battery unit 10B, and the first battery unit 10A, and these battery units 10 are likely to be heated in this order.

Here, the heater 40 is disposed on the upstream side in the flow channel 30 of the battery units 10 and is common to the plurality of battery units 10. That is, the control device 60 controls the changing mechanisms 50 such that the heat transfer capacity between the heat exchange medium W and the battery unit 10 (for example, the fourth battery unit 10D) farther from the common heater 40 (disposed on the downstream side) becomes larger than the heat transfer capacity between the heat exchange medium and the battery unit 10 (for example, the first battery unit 10A) closer to the common heater 40 (disposed on the upstream side).

Next, in step S11, it is determined whether variations in the temperatures Tm (TmA, TmB, TmC, and TmD) of the battery units 10 are present. The allowable range of variations in the temperatures Tm may be, for example, a predetermined temperature difference (for example, 2 to 3° C.) between the maximum temperature and the minimum temperature. When it is determined that variations in the temperatures Tm are present, the processing proceeds to step S12. When it is determined that variations in the temperatures Tm are not present, the processing proceeds to step S13.

Next, in step S12, the heat transfer capacities between the battery units 10A, 10B, 10C, and 10D and the heat exchange medium W are adjusted by adjusting the restraint forces FA, FB, and FC of the changing mechanisms 50A, 50B, and 50C while the restraint force FD of the fourth changing mechanism 50D is maintained to the maximum. Then, the processing returns to step S11.

Next, in step S13, it is determined whether the temperatures Tm (temperatures TmA, TmB, TmC, and TmD) of the battery units 10 (battery units 10A, 10B, 10C, and 10D) are equal to or higher than the predetermined temperature Tr (Tm Tr). When Tm<Tr, the processing proceeds to step S14. When Tm Tr, the processing proceeds to step S15.

Next, in step S14, it is determined whether the temperature Tw of the heat exchange medium W is equal to or higher than the temperatures Tm (that is, the first temperatures T1) of the battery units 10 (Tw≥Tm (T1)). When Tw≥Tm (T1), the processing returns to step S11. When Tw<Tm(T1), the processing returns to step S9.

Next, in step S15, the restraint forces F of the changing mechanisms 50 are made uniformized. That is, FA=FB=FC=FD is met. Then, the processing proceeds to the return.

(Operation and Effect of the First Embodiment)

In the embodiment, when the temperature Tw of the heat exchange medium W does not reach the first temperature T1 which is equivalent to the temperature Tm of the battery unit 10 while the heat exchange medium W is heated by the heater 40, the heat transfer capacity between the battery unit 10 and the heat exchange medium W is reduced by controlling the changing mechanism 50 using the control device 60. Since this suppresses the heat transfer from the battery units 10 to the heat exchange medium W, delay in the heating of the battery unit 10 can be suppressed.

Then, after the temperature Tw of the heat exchange medium W reaches the first temperature T1, which is equivalent to the temperature Tm of the battery unit 10, the heat transfer capacity between the battery unit 10 and the heat exchange medium W is increased by controlling the changing mechanism 50 using the control device 60. Since the temperature Tw of the heat exchange medium W is already higher than the temperature Tm (first temperature T1) of the battery unit 10 at this time, even when the heat transfer capacity between the battery unit 10 and the heat exchange medium W is increased, the heat transfer from the battery unit 10 to the heat exchange medium W is substantially absent, and the heat transfer from the heat exchange medium W to the battery units 10 is promoted.

As described above, after the temperature Tw of the heat exchange medium W reaches the first temperatures T1, which are equivalent to the temperatures Tm of the battery units 10, the temperatures of the battery units 10 can be quickly heated by changing the heat transfer capacities between the battery units 10 and the heat exchange medium W.

Furthermore, the temperatures of the battery units 10 can be quickly heated more easily by switching the heat exchange mode from the heat insulation mode to the heat transfer mode after the temperature Tw of the heat exchange medium W reaches the first temperature T1.

By the way, when the internal resistance R of the battery unit 10 is high, for example, the battery unit 10 cannot often drive the motor because the battery unit 10 does not fully exercise the ability. Here, as the battery unit 10 is charged or discharged, the battery unit 10 is heated internally and rises in temperature. The internal resistance R of the battery unit 10 decreases as the temperature of the battery unit 10 rises and is saturated when the temperature Tm of the battery unit 10 reaches the second temperature T2 (see FIG. 5).

Therefore, to fully exercise the ability of the battery unit 10, the temperature Tm of the battery unit 10 is preferably raised to the second temperature T2 quickly by using the internal heat generation of the battery units 10. In addition, to effectively heat the battery unit 10, the temperature Tw of the heat exchange medium W is preferably raised to the first temperature T1 quickly.

Accordingly, the temperatures of the battery unit 10 and the heat exchange medium W can be effectively heated by checking whether the temperature of the heat exchange medium W has reached the first temperature T1 (Tm) and whether the temperature of the battery unit 10 has reached the second temperature T2.

In the first temperature rising pattern P1 (see FIG. 7), since the temperature Tw of the heat exchange medium W has already reached the first temperature T1 (Tm), the temperatures of the battery unit 10 can be effectively raised by switching the heat exchange mode from the heat insulation mode to the heat transfer mode to promote the heat transfer from the heat exchange medium W to the battery unit 10.

On the other hand, since the temperature Tm of the battery unit 10 has already reached the second temperature T2, no more electricity supply (discharging) from the battery unit 10 to the heater 40 is required to reduce the internal resistance R of the battery unit 10. Accordingly, unnecessary power consumption of the battery unit 10 can be eliminated by stopping the electricity supply E1 from the battery unit 10 to the heater 40.

In the second temperature rising pattern P2 (see FIG. 8), as in the first temperature rising pattern P1 described above, since the temperature Tw of the heat exchange medium W has already reached the first temperature T1 (Tm), the temperature of the battery unit 10 can be effectively raised by switching the heat exchange mode from the heat insulation mode to the heat transfer mode to promote the heat transfer from the heat exchange medium W to the battery unit 10.

On the other hand, since the temperature Tm of the battery unit 10 has not reached the second temperature T2, the electricity supply (discharging) E1 from the battery unit 10 to the heater 40 needs to be maintained without being stopped to reduce the internal resistance R of the battery unit 10. However, since the heat transfer from the heat exchange medium W to the battery unit 10 is promoted in the heat transfer mode as described above, the electricity supply E1 from the battery unit 10 to the heater 40 can be lower than that before the temperature Tw of the heat exchange medium W reaches the first temperature T1 (Tm). This can raise the temperature Tm of the battery unit 10 to the second temperature T2 while minimizing the power consumption of the battery unit 10.

In the third temperature rising pattern P3 (see FIG. 9), since the temperature Tm of the battery unit 10 has already reached the second temperature T2, no more electricity supply (discharging) from the battery unit 10 to the heater 40 is required to reduce the internal resistance R of the battery unit 10.

On the other hand, since the temperature Tw of the heat exchange medium W has not reached the first temperature T1 (Tm), the electricity supply from the battery unit 10 or another power supply to the heater 40 needs to be continued while the heat insulation mode is kept as the heat exchange mode. Accordingly, the electricity supply E2 from the external power supply 70 to the heater 40 is started. This can suppress or stop the electricity supply E1 from the battery unit 10 to the heater 40. As described above, by using the help of the external power supply 70, the temperature Tw of the heat exchange medium W can be raised to the first temperature T1 (Tm) while the power consumption of the battery unit 10 is suppressed.

The heat transfer capacity between the battery unit 10 and the heat exchange medium W can be easily changed by the changing mechanism 50 including the heat transfer material 51 and the electromagnetic solenoid (area changing mechanism) 52.

The temperature Tm of part of the heat exchange medium W in contact with the battery unit 10 (for example, the fourth battery unit 10D) farther from (disposed on the downstream side of) the common heater 40 is likely to be lower than the temperature Tm of part of the heat exchange medium W in contact with the battery unit 10 (for example, the first battery unit 10A) closer to (disposed on the upstream side of) the common heater 40.

Accordingly, the battery unit 10 farther from the common heater 40 is easier to exchange heat with the heat exchange medium W by making the heat transfer capacity between the battery unit 10 farther from the common heater 40 and the heat exchange medium W larger than the heat transfer capacity between the battery unit 10 closer to the common heater 40 and the heat exchange medium W. This can evenly raise the temperatures of the plurality of battery units 10 regardless of the distances from the common heater 40 (regardless of whether the battery units 10 are disposed on the upstream side or on the downstream side).

(Modification of the First Embodiment)

A modification of the first embodiment will be described below. It should be noted that the same components as those of the embodiment described above are denoted by the same reference numerals to omit detailed descriptions thereof.

Although the electricity supply E1 to the common heater 40 is performed by the first battery unit 10A, the second battery unit 10B, the third battery unit 10C, and the fourth battery unit 10D in this order in the embodiment described above, but the present disclosure is not limited to this example. The control device 60 may cause at least some of the plurality of battery units 10 to alternately supply electric power to the common heater 40.

For example, the first battery unit 10A and the second battery unit 10B of the plurality of battery units 10 may supply electric power to the common heater 40 alternately. That is, after the first battery unit 10A supplies electric power to the common heater 40, the second battery unit 10B may supply electric power to the common heater 40 and then the first battery unit 10A may supply electric power to the common heater 40 again. In addition, all the battery units 10A, 10B, 10C, and 10D may supply electric power to the common heater 40 alternately.

This can promote the internal heat generation of the battery unit 10 and efficiently reduce the internal resistance R of the battery unit 10.

Figure 13:
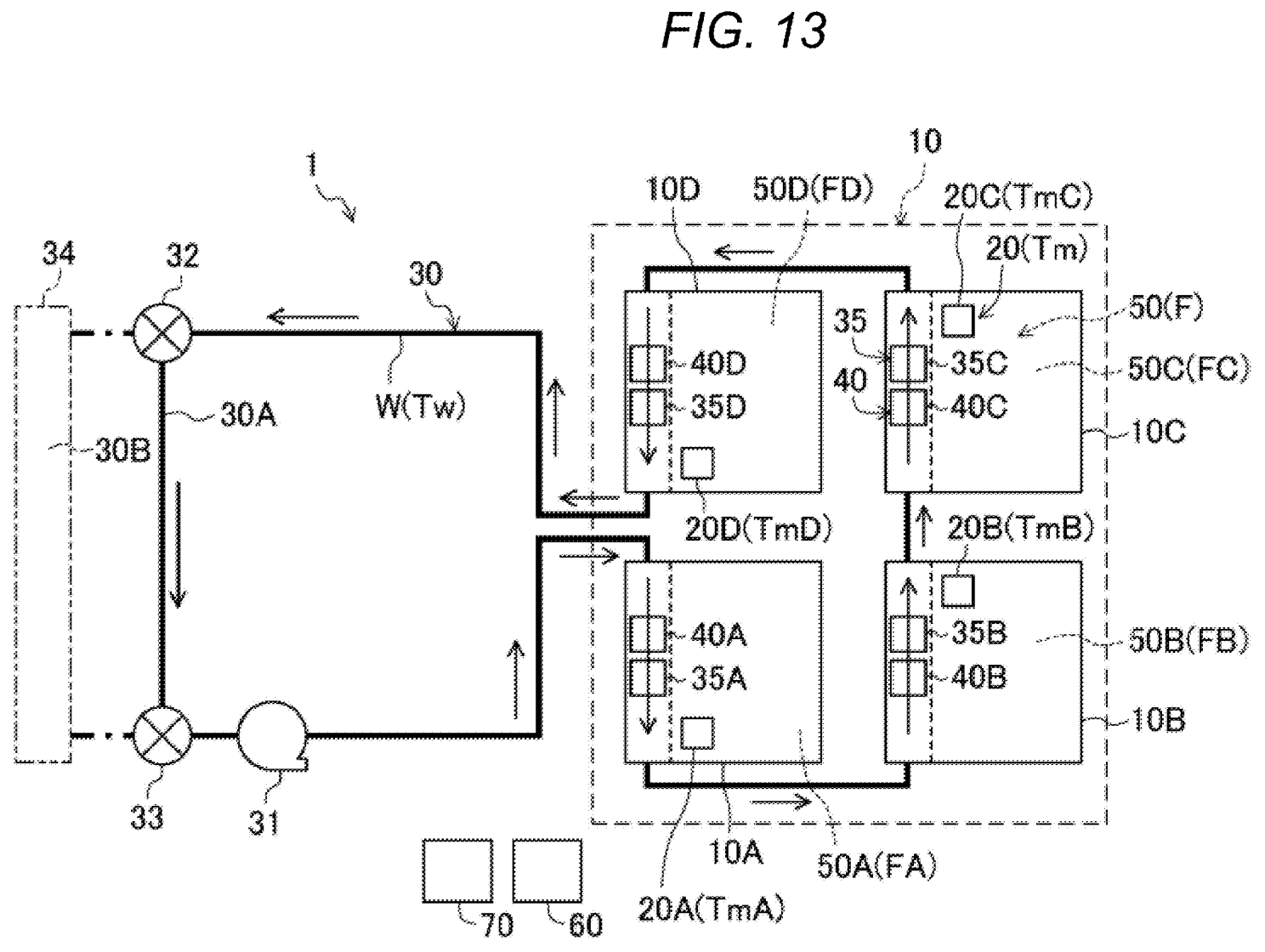

The heater 40 is common to the plurality of battery units 10 in the embodiment described above, but the present disclosure is not limited to this example. As illustrated in FIG. 13, the heat exchange medium W may be heated by a plurality of heaters 40 that correspond to the plurality of battery units 10.

In this case, the heaters 40 include a total of four heaters: a first heater 40A, a second heater 40B, a third heater 40C, and a fourth heater 40D. The heaters 40A, 40B, 40C, and 40D are disposed near the corresponding battery units 10A, 10B, 10C, and 10D, respectively, and the heaters 40A, 40B, 40C, and 40D heat parts of the heat exchange medium W that are in contact with the corresponding battery units 10A, 10B, 10C, and 10D.

In addition, the medium temperature sensors 35 include a total of four medium temperature sensors: a first medium temperature sensor 35A, a second medium temperature sensor 35B, a third medium temperature sensor 35C, and a fourth medium temperature sensor 35D. The medium temperature sensors 35A, 35B, 35C, and 35D are disposed near the corresponding battery units 10A, 10B, 10C, and 10D, respectively, and detect the temperatures of parts of the heat exchange medium W that are in contact with the corresponding battery units 10A, 10B, 10C, and 10D.

The control device 60 does not circulate the heat exchange medium W through the flow channel 30 when the temperature of the heat exchange medium W does not reach the first temperature T1 (Tm) while the heat exchange medium W is heated by the heaters 40A, 40B, 40C, and 40D.

This can quickly heat the heat exchange medium W to the first temperature T1 (Tm).

Second Embodiment

A second embodiment will be described below. It should be noted that the same components as those of the embodiment described above are denoted by the same reference numerals to omit detailed descriptions thereof.

Figure 14:
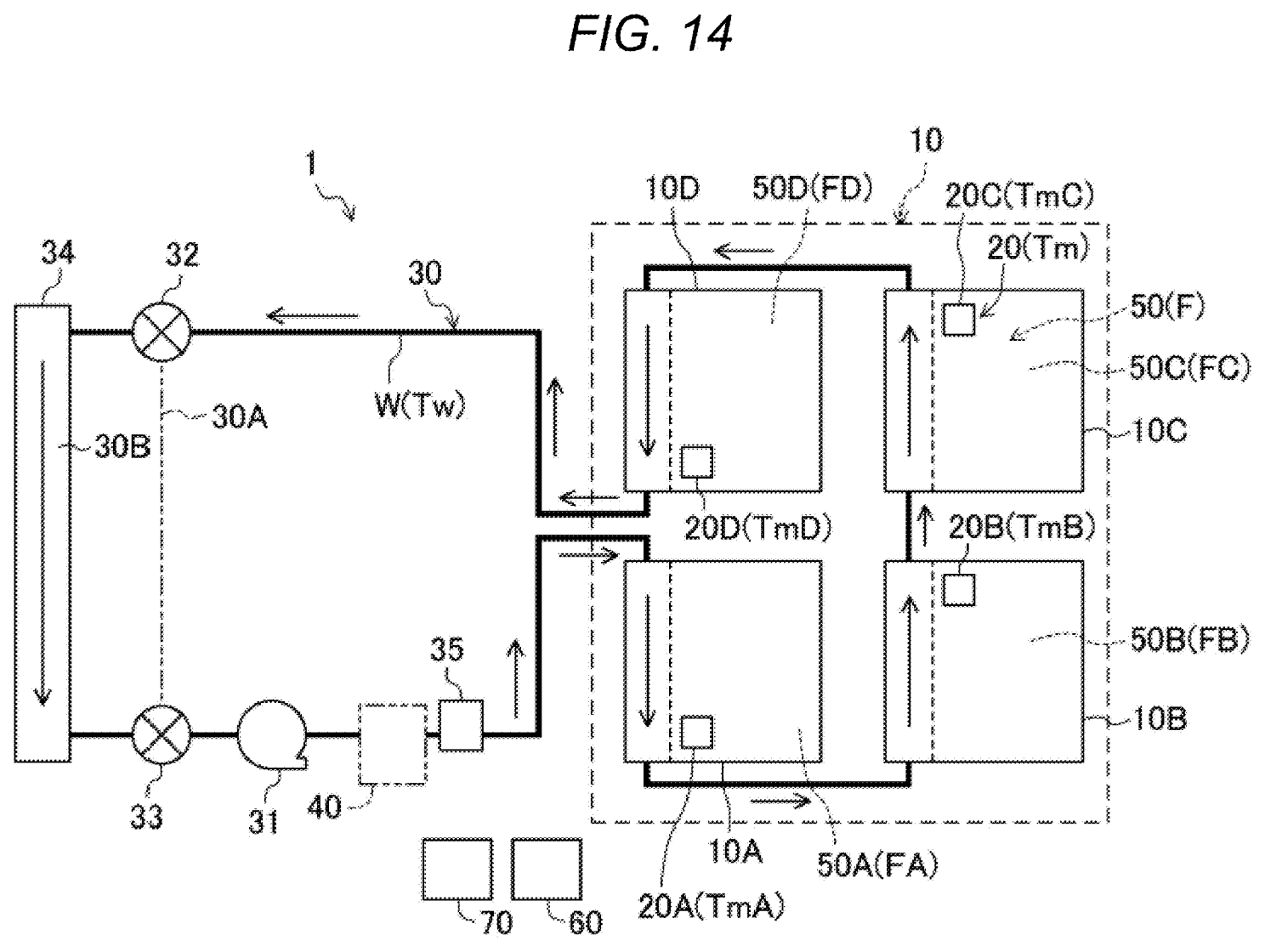

FIG. 14 is a schematic structure diagram of a battery unit temperature management device 1 according to the second embodiment. In the embodiment, the heater 40 does not operate. In addition, the heat exchange medium W in the flow channel 30 is cooled by the heat exchanger 34 by passing through the heat exchange flow channel 30B. The temperature Tw of the heat exchange medium W becomes lower than the temperatures Tm of the battery units 10 by being cooled by the heat exchanger 34. The heat exchange medium W is used as a cooling medium to cool the battery units 10.

The heat exchange medium W exchanges heat with the battery units 10 in the order of the first battery unit 10A, the second battery unit 10B, the third battery unit 10C, and the fourth battery unit 10D from the upstream side to the downstream side of the flow channel 30. Here, each time the heat exchange medium W exchanges heat with each of the battery units 10 in sequence from the upstream side to the downstream side, the temperature Tw of the heat exchange medium W rises gradually. That is, each time the heat exchange medium W exchanges heat with the battery units 10 from the upstream side to the downstream side in sequence, the temperature Tw of the heat exchange medium W gradually approaches the temperatures Tm of the battery units 10.

Accordingly, the battery unit 10 (for example, the fourth battery unit 10D) on the downstream side is less likely to exchange heat with the heat exchange medium W than the battery unit (for example, the first battery unit 10A) on the upstream side. Ultimately, variations in the temperatures Tm of the battery units 10 occur.

In the embodiment, variations in the temperatures Tm of the plurality of battery units 10 are suppressed by the following method. In particular, since detailed temperatures management is required (see FIG. 6) when the battery units 10 are charged or discharged at a high rate, suppression of variations in the temperatures Tm of the plurality of battery units 10 is important.

Figure 15:
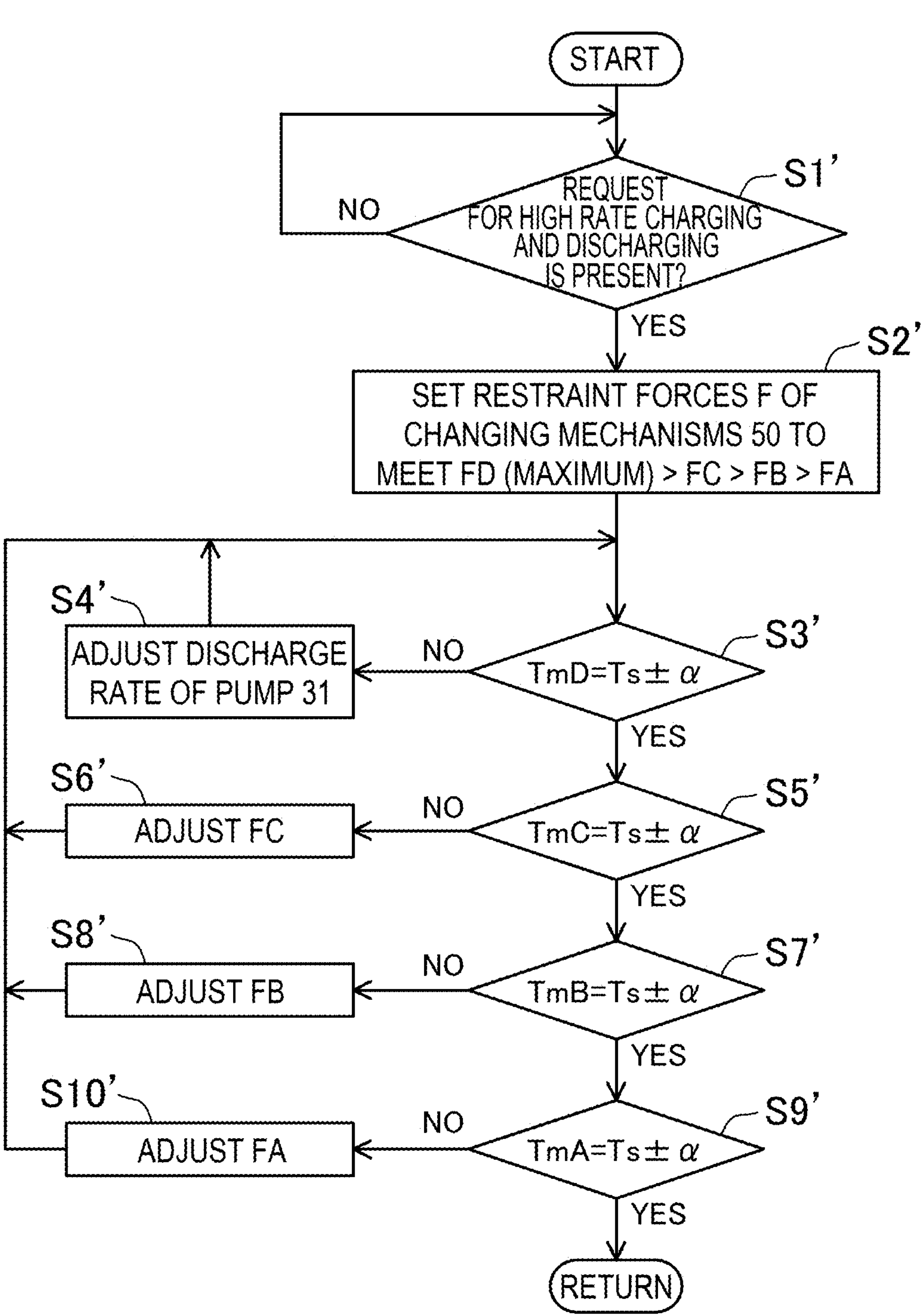
FIG. 15 is a flowchart illustrating an example of a control form of a battery unit temperature management device according to the second embodiment.

FIG. 15 a flowchart illustrating an example of the control form of the battery unit temperature management device 1. First, in step S1', it is determined whether there is a request for high rate charging and discharging of the battery units 10. When it is determined that there is a request for high rate charging and discharging, the processing proceeds to step S2'. When it is determined that there is no request for high rate charging and discharging (that is, low rate charging and discharging), since detailed temperature management is not necessary, the processing returns to the start. It should be noted that the presence or absence of a request for high rate charging and discharging can be determined based on the history data of current/voltage regarding the battery units 10 and the like.

Next, in step S2', the control device 60 controls, for each of the battery units 10, the change of the heat transfer capacity between each of the battery units 10 and the heat exchange medium W by using the changing mechanism 50, so as to reduce the temperature differences among the battery units 10. Specifically, the control device 60 makes the heat transfer capacity between the heat exchange medium W and the battery unit 10 (for example, the first battery unit 10A) disposed on the upstream side in the flow direction smaller than the heat transfer capacity between the heat exchange medium W and the battery unit 10 (for example, the fourth battery unit 10D) disposed on the downstream side in the flow direction.

In addition, the control device 60 maximizes the heat transfer capacity between the fourth battery unit 10D disposed on the most downstream side in the flow direction and the heat exchange medium W.

Specifically, the control device 60 maximizes the restraint force FD of the fourth changing mechanism 50D. Furthermore, the magnitudes of the restraint forces F of the changing mechanisms 50 (changing mechanisms 50A, 50B, 50C, and 50D) are set to satisfy FD>FC>FB>FA. That is, the heat transfer capacities between the battery units 10 and the heat exchange medium W become larger in the order of the fourth battery unit 10D, the third battery unit 10C, the second battery unit 10B, and the first battery unit 10A and becomes easier to cool. Then, the processing proceeds to step S3'.

Next, in step S3', it is determined whether the temperature TmD of the fourth battery unit 10D detected by the fourth battery temperature sensor 20D falls within a predetermined temperature range Ts±α. The predetermined temperature range Ts±α is included in the target management temperature B (see FIG. 6) in the high rate charging and discharging. Ts is, for example, 45° C. The temperature a is, for example, a few degrees or less.

In step S3', when it is determined that the temperature TmD of the fourth battery unit 10D falls outside the predetermined temperature range Ts±α, the processing proceeds to step S4'. Then, the flowrate of the heat exchange medium W in the flow channel 30 is adjusted (increased or decreased) by regulating the discharge rate of the pump 31, and the processing returns to step S3'. When it is determined that the temperature TmD of the fourth battery unit 10D falls within the predetermined temperature range Ts±α, the processing proceeds to step S5'. It should be noted that, since the restraint force FD of the fourth changing mechanism 50D is fixed at the maximum, there is no room to adjust (increase or decrease) the restraint force FD.

Next, in step S5', it is determined whether the temperature TmC of the third battery unit 10C detected by the third battery temperature sensor 20C falls within the predetermined temperature range Ts±α. When it is determined that the temperature TmC of the third battery unit 10C falls outside the predetermined temperature range Ts±α, the processing proceeds to step S6'. Then, the restraint force FC of the third changing mechanism 50C is adjusted (increased or decreased), and the processing returns to step S3'. When it is determined that the temperature TmC of the third battery unit 10C falls within the predetermined temperature range Ts±α, the processing proceeds to step S7'.

Next, in step S7', it is determined whether the temperature TmB of the second battery unit 10B detected by the second battery temperature sensor 20B falls within the predetermined temperature range Ts±α. When it is determined that the temperature TmB of the second battery unit 10B falls outside the predetermined temperature range Ts±α, the processing proceeds to step S8'. Then, after the restraint force FB of the second changing mechanism 50B is adjusted (increased or decreased), the processing returns to step S3'. When it is determined that the temperature TmB of the second battery unit 10B falls within the predetermined temperature range Ts±α, the processing proceeds to step S9'.

Next, in step S9', it is determined whether the temperature TmA of the first battery unit 10A detected by the first battery temperature sensor 20A falls within the predetermined temperature range Ts±α. When it is determined that the temperature TmA of the first battery unit 10A falls outside the predetermined temperature range Ts±α, the processing proceeds to step S10'. Then, after the restraint force FA of the first changing mechanism 50A is adjusted (increased or decreased), the processing returns to step S3'. When it is determined that the temperature TmA of the first battery unit 10A falls within the predetermined temperature range Ts±α, the processing proceeds to the return.

As described above, the control device 60 adjusts the heat transfer capacities between the battery units 10 and the heat exchange medium W based on the temperatures Tm of the battery units 10 detected by the battery temperature sensors 20. For example, the control device 60 decreases the heat transfer capacity between the hot battery unit 10 (having a large temperature difference with respect to the heat exchange medium W) and the heat exchange medium W or increases the heat transfer capacity between the cool battery unit 10 (having a small temperature difference with respect to the heat exchange medium W) and the heat exchange medium W.

(Operation and Effect of the Second Embodiment)

In the embodiment, the changing mechanisms 50 provided to correspond to the battery units 10 change the heat transfer capacities between the battery units 10 and the heat exchange medium W. Then, the control device 60 reduces the temperature difference between the battery units 10 by controlling, for each of the battery units 10, changes of the heat transfer capacities by using the changing mechanisms 50. This can suppress variations in the temperatures Tm of the plurality of battery units 10.

The temperature difference between part of the heat exchange medium W in contact with the battery unit 10 (for example, the first battery unit 10A) disposed on the upstream side in the flow direction in the flow path 30 and the battery unit 10 on the upstream side is likely to be larger than the temperature difference between part of the heat exchange medium W in contact with the battery unit 10 (for example, the four battery unit 10D) disposed on the downstream side in the flow direction in the flow path 30 and the battery unit 10 on the downstream side. That is, the battery unit 10 disposed on the upstream side is more likely to exchange heat with the heat exchange medium W than the battery unit 10 disposed on the downstream side.

Accordingly, by adjusting the heat transfer capacity by using the changing mechanisms 50, the battery unit 10 disposed on the upstream side is less likely to exchange heat with the heat exchange medium W than the battery unit 10 disposed on the downstream side. This can suppress variations in the temperatures Tm of the plurality of the battery units 10 disposed in the flow direction in the flow channel 30.

The temperature difference between part of the heat exchange medium W in contact with the battery unit 10 (for example, the fourth battery unit 10D) disposed on the downstream side in the flow direction in the flow path 30 and the battery unit 10 on the downstream side is likely to be smaller than the temperature difference between part of the heat exchange medium W in contact with the battery unit 10 (for example, the first battery unit 10A) disposed on the upstream side in the flow direction in the flow path 30 and the battery unit 10 on the upstream side. That is, the fourth battery unit 10D disposed on the most downstream side is less likely to exchange heat with the heat exchange medium W than the other battery units 10A, 10B, and 10C disposed on the upstream side.

Accordingly, by maximizing the heat transfer capacity (restraint force F4) between the fourth battery unit 10D disposed on the most downstream side and the heat exchange medium W, the fourth battery unit 10D disposed on the most downstream side is most likely to exchange heat with the heat exchange medium W. This can change the temperature of the fourth battery unit 10D disposed on the most downstream side with the minimum flowrate (discharge rate of the pump 31) of the heat exchange medium W flowing through the flow channel 30.

The heat transfer capacities between the battery units 10 and the heat exchange medium W can be easily changed by using the changing mechanisms 50, each of which includes the heat transfer material 51 and the electromagnetic solenoid (area changing mechanism) 52.

Since the heat transfer capacities are adjusted based on the temperatures Tm of the battery units 10 detected by the battery temperature sensors 20, the temperatures Tm of the battery units 10 can be adjusted in more detail.

(Modification of the Second Embodiment)

In the embodiment described above, the control device 60 makes the heat transfer capacity between the battery unit 10 disposed on the upstream side in the flow direction and the heat exchange medium W smaller than the heat transfer capacity between the battery unit 10 disposed on the downstream side in the flow direction and the heat exchange medium W, but the present disclosure is not limited to this example.

For example, when the heater is placed only in the vicinity of the second battery unit 10B among the plurality of battery units 10, the second battery unit 10B is less likely to exchange heat (cool) with the heat exchange medium W than the other battery units 10A, 10C, and 10D.

In this case, the heat transfer capacity between the second battery unit 10B and the heat exchange medium W only needs to be larger than the heat transfer capacities between the other battery units 10A, 10C, and 10D and the heat exchange medium W. In this case, the control device 60 makes the heat transfer capacity between the second battery unit 10B disposed on the upstream side in the flow direction and the heat exchange medium W larger than the heat transfer capacities between the battery units 10C and 10D disposed on the downstream side in the flow direction and the heat exchange medium W.

In the embodiment described above, the case in which the heat exchange medium W passes through the heat exchange flow channel 30B to cool the battery units 10 is illustrated, but the present disclosure is not limited to this case. The heat exchange medium W may pass through a bypass flow channel 30A to heat the battery units 10. It should be noted that the heater 40 operates in the flow channel 30 in this case.

Other Embodiments

Preferable embodiments of the present disclosure have been described above, but the descriptions do not limit the present disclosure and, of course, various modifications are possible.

The area changing mechanism is not limited to the electromagnetic solenoid 52 and may be, for example, a mechanical piston-cylinder mechanism. In the embodiments described above, the heat transfer material 51 of a corrugated plate shape has the heat transfer surface 51*a* for exchanging heat with the heat exchange medium W, but the present disclosure is not limited to this example. A heat transfer material may be prepared separately from the heat transfer material 51 of a corrugated plate shape and the heat transfer material prepared separately may have a heat transfer surface for exchanging heat with the heat exchange medium W.

INDUSTRIAL AVAILABILITY

The present disclosure is extremely useful and has high industrial availability because of its applicability to battery unit temperature management devices.

DESCRIPTION OF REFERENCE SIGNS AND NUMERALS

1: battery unit temperature management device
10: battery unit
11: battery cell
20: battery temperature sensor
30: flow path
35: medium temperature sensor
40: heater
50: changing mechanism
51: heat transfer material
52: electromagnetic solenoid (area changing mechanism)
60: control device
70: external power supply
E1: electricity supply
E2: electricity supply
C: external charging
W: heat exchange medium
Tw: temperature
Tm: temperature
T1: first temperature
T2: second temperature
R: internal resistance
F: restraint force
t: time

The invention claimed is:

1. A battery unit temperature management device comprising:

a battery unit that is capable of being charged and discharged;

a heater that operates due to electricity supply from the battery unit and heats a heat exchange medium that exchanges heat with the battery unit;

a changing structure that changes a heat transfer capacity between the battery unit and the heat exchange medium; and a controller that controls heating of the heat exchange medium by the heater and a change of the heat transfer capacity by the changing structure, wherein the controller makes the heat transfer capacity when a temperature of the heat exchange medium does not reach a first temperature that is equivalent to a temperature of the battery unit while the heat exchange medium is heated by the heater smaller than the heat transfer capacity when the temperature of the heat exchange medium has reached the first temperature while the heat exchange medium is heated by the heater, the battery unit includes a plurality of battery cells disposed side by side, the changing structure includes a heat transfer material disposed between adjacent battery cells of the plurality of battery cells, the heat transfer material exchanging heat with the heat exchange medium, and an area changing structure that changes the heat transfer capacity between the battery cells and the heat exchange medium by changing contact areas between the heat transfer material and the adjacent battery cells, and the heat transfer material is in a corrugated plate shape, and changes in shape from the corrugated plate shape to a flat plate shape when receiving an external force in a direction in which the battery cells are arranged.

2. The battery unit temperature management device according to claim 1, wherein the changing structure switches, between a heat insulation mode that suppresses the exchanging heat with the battery unit and a heat transfer mode that promotes the exchanging heat with the battery unit, and the controller places the heat exchange mode in the heat insulation mode when the temperature of the heat exchange medium does not reach the first temperature while the heat exchange medium is heated by the heater, and the controller places the heat exchange mode in the heat transfer mode when the temperature of the heat exchange medium has reached the first temperature while the heat exchange medium is heated by the heater.

3. The battery unit temperature management device according to claim 2, wherein the controller controls the heating of the heat exchange medium by the heater and the change of the heat transfer capacity by the changing structure based on whether the heat exchange medium has reached the first temperature and whether the battery unit has reached a second temperature at which a decrease in an internal resistance of the battery unit is saturated.

4. The battery unit temperature management device according to claim 3, wherein, if the temperature of the battery unit has reached the second temperature when the temperature of the heat exchange medium has reached the first temperature while the heat exchange medium is heated by the heater, the controller stops the electricity supply from the battery unit to the heater and switches the heat exchange mode from the heat insulation mode to the heat transfer mode.

5. The battery unit temperature management device according to claim 3, wherein, if the temperature of the battery unit does not reach the second temperature when the temperature of the heat exchange medium has reached the first temperature while the heat exchange medium is heated by the heater, the controller does not stop the electricity supply from the battery unit to the heater and switches the heat exchange mode from the heat insulation mode to the heat transfer mode while making the electricity supply smaller than the electricity supply before the heat exchange medium has reached the first temperature.

6. The battery unit temperature management device according to claim 3, wherein, if the temperature of the heat exchange medium does not reach the first temperature when the temperature of the battery unit has reached the second temperature while the heat exchange medium is heated by the heater, the controller starts electricity supply from an external power supply to the heater while keeping the heat exchange mode at the heat insulation mode.

7. The battery unit temperature management device according to claim 1, wherein the plurality of battery cells each have a flat shape and are disposed such that surfaces of the battery cells with a larger area are stacked together.

8. The battery unit temperature management device according to claim 1, wherein the plurality of battery cells is electrically connected to each other by a busbar spring.

9. The battery unit temperature management device according to claim 1, wherein a positive terminal and a negative terminal are provided on one side surface of each of the plurality of battery cells.

10. The battery unit temperature management device according to claim 1, wherein the heat transfer material is made of copper or aluminum.

11. The battery unit temperature management device according to claim 1, wherein the heat transfer material has a heat transfer surface for exchanging heat with the heat exchange medium that passes beside the battery unit.

12. The battery unit temperature management device according to claim 1, wherein the area changing structure is an electromagnetic solenoid and applies an external force to the plurality of battery cells in the direction in which the battery cells are arranged.

13. The battery unit temperature management device according to claim 12, wherein when the electromagnetic solenoid is moved in a pulling direction, the contact areas between the heat transfer material and the adjacent battery cells are reduced, and the changing structure is in a heat insulation mode.

14. The battery unit temperature management device according to claim 12, wherein when the electromagnetic solenoid is moved in an extending direction, the contact areas between the heat transfer material and the adjacent battery cells are increased, and the changing structure is in a heat transfer mode.

15. The battery unit temperature management device according to claim 2, wherein the changing structure further comprises an intermediate mode between the heat insulation mode and the heat transfer mode.

16. The battery unit temperature management device according to claim 1, wherein the battery unit temperature management device includes a plurality of battery units, the battery unit being one of the plurality of battery units, a plurality of changing structures provided to correspond to the battery units, the changing structure being one of the plurality of changing structures, and a flow channel through which the heat exchange medium circulates so as to pass through the battery units, the heat exchange medium is disposed in the flow path and is heated by the heater common to the plurality of battery units, and the controller makes the heat transfer capacity between the battery unit farther from the heater common to the battery units and the heat exchange medium larger than the heat transfer capacity between the battery unit closer to the heater common to the battery units and the heat exchange medium.

17. The battery unit temperature management device according to claim 1, wherein the battery unit temperature management device includes a plurality of battery units, the battery unit being one of the plurality of battery units, a plurality of changing structures provided to correspond to the battery units, the changing structure being one of the plurality of changing structures, and a flow channel through which the heat exchange medium circulates so as to pass through the battery units, the heat exchange medium is disposed in the flow path and is heated by the heater common to the plurality of battery units, and the controller causes at least a part of the plurality of battery units to alternately perform electricity supply to the heater common to the plurality of battery units.

18. The battery unit temperature management device according to claim 1, wherein the battery unit temperature management device includes a plurality of battery units, the battery unit being one of the plurality of battery units, a plurality of changing structures provided to correspond to the battery units, the changing structure being one of the plurality of changing structures, and a flow channel through which the heat exchange medium circulates so as to pass through the battery units, the heat exchange medium is heated by a plurality of heaters corresponding to the plurality of battery units, the heater being one of the plurality of heaters, the controller controls how the heat exchange medium circulates through the flow path, and the controller does not circulate the heat exchange medium through the flow path when the heat exchange medium does not reach the first temperature while the heat exchange medium is heated by the heaters.

19. A battery unit temperature management device comprising:

a battery unit that is capable of being charged and discharged;

a heater that operates due to electricity supply from the battery unit and heats a heat exchange medium that exchanges heat with the battery unit;

a changing structure that changes a heat transfer capacity between the battery unit and the heat exchange medium; and a controller that controls heating of the heat exchange medium by the heater and a change of the heat transfer capacity by the changing structure, wherein the controller makes the heat transfer capacity when a temperature of the heat exchange medium does not reach a first temperature that is equivalent to a temperature of the battery unit while the heat exchange medium is heated by the heater smaller than the heat transfer capacity when the temperature of the heat exchange medium has reached the first temperature while the heat exchange medium is heated by the heater, the battery unit includes a plurality of battery cells disposed side by side, the changing structure includes a heat transfer material disposed between adjacent battery cells of the plurality of battery cells, the heat transfer material exchanging heat with the heat exchange medium, and an area changing structure that changes the heat transfer capacity between the battery cells and the heat exchange medium by changing contact areas between the heat transfer material and the adjacent battery cells, and the area changing structure is an electromagnetic solenoid and applies an external force to the plurality of battery cells in the direction in which the battery cells are arranged.

* * * * *